United States Patent
Coe-Sullivan et al.

(10) Patent No.: US 8,718,437 B2
(45) Date of Patent: May 6, 2014

(54) COMPOSITIONS, OPTICAL COMPONENT, SYSTEM INCLUDING AN OPTICAL COMPONENT, DEVICES, AND OTHER PRODUCTS

(75) Inventors: Seth Coe-Sullivan, Belmont, MA (US); John R. Linton, Concord, MA (US); Craig Breen, Somerville, MA (US); Jonathan S. Steckel, Cambridge, MA (US); Mark Comerford, Boston, MA (US); Rohit Modi, Walthm, MA (US)

(73) Assignee: QD Vision, Inc., Lexington, MA (US)

( * ) Notice: Subject to any disclaimer, the term of this patent is extended or adjusted under 35 U.S.C. 154(b) by 0 days.

(21) Appl. No.: 12/283,609

(22) Filed: Sep. 12, 2008

(65) Prior Publication Data

US 2009/0162011 A1    Jun. 25, 2009

Related U.S. Application Data

(63) Continuation-in-part of application No. PCT/US2008/007902, filed on Jun. 25, 2008, and a continuation-in-part of application No. 12/231,887, filed on Sep. 5, 2008, which is a continuation of application No. PCT/US2007/005589, filed on Mar. 6, 2007.

(60) Provisional application No. 60/946,090, filed on Jun. 25, 2007, provisional application No. 60/949,306, filed on Jul. 12, 2007, provisional application No. 60/946,382, filed on Jun. 26, 2007, provisional application No. 60/971,885, filed on Sep. 12, 2007, provisional application No. 60/973,644, filed on Sep. 19, 2007, provisional application No. 61/016,227, filed on Dec. 21, 2007, provisional application No. 60/950,598, filed on Jul. 18, 2007, provisional application No. 60/779,740, filed on Mar. 7, 2006.

(51) Int. Cl.
*G02B 6/00* (2006.01)
*G02B 6/10* (2006.01)

(52) U.S. Cl.
USPC ............................. 385/141; 385/129

(58) Field of Classification Search
USPC ............................................. 385/141
See application file for complete search history.

(56) References Cited

U.S. PATENT DOCUMENTS

| | | | |
|---|---|---|---|
| 3,510,732 | A | 5/1970 | Amans et al. |
| 3,774,086 | A | 11/1973 | Vincent, Jr. |

(Continued)

FOREIGN PATENT DOCUMENTS

| | | |
|---|---|---|
| EP | 0328202 | 8/1989 |
| EP | 179330 | 11/2006 |

(Continued)

OTHER PUBLICATIONS

International Report on Patentability,dated Sep. 9, 2008, for PCT/US2007/005589.

(Continued)

*Primary Examiner* — Charlie Peng

(57) ABSTRACT

A composition useful for altering the wavelength of visible or invisible light is disclosed. The composition comprising a solid host material and quantum confined semiconductor nanoparticles, wherein the nanoparticles are included in the composition in amount in the range from about 0.001 to about 15 weight percent based on the weight of the host material. The composition can further include scatterers. An optical component including a waveguide component and quantum confined semiconductor nanoparticles is also disclosed. A device including an optical component is disclosed. A system including an optical component including a waveguide component and quantum confined semiconductor nanoparticles and a light source optically coupled to the waveguide component is also disclosed. A decal, kit, ink composition, and method are also disclosed. A TFEL including quantum confined semiconductor nanoparticles on a surface thereof is also disclosed.

33 Claims, 3 Drawing Sheets

1) Light source
2) Waveguide component
3) Layer comprising quantum confined semiconductor nanoparticles

(56) References Cited

U.S. PATENT DOCUMENTS

| | | |
|---|---|---|
| 3,825,792 A | 7/1974 | Rokosz et al. |
| 3,875,456 A | 4/1975 | Kano et al. |
| 4,035,686 A | 7/1977 | Fleming |
| 4,082,889 A | 4/1978 | DiStefano |
| 4,130,343 A | 12/1978 | Miller et al. |
| 4,366,407 A | 12/1982 | Walsh |
| 4,382,272 A | 5/1983 | Quella et al. |
| 4,608,301 A | 8/1986 | Ishizuka et al. |
| 4,652,464 A | 3/1987 | Ludlum et al. |
| 4,701,276 A | 10/1987 | Wyman |
| 4,719,386 A | 1/1988 | Toho |
| 4,738,798 A | 4/1988 | Mahler |
| 4,766,526 A | 8/1988 | Morimoto et al. |
| 4,780,752 A | 10/1988 | Angerstein et al. |
| 4,820,016 A | 4/1989 | Cohen et al. |
| 4,929,053 A | 5/1990 | Muller-Stute et al. |
| 4,931,692 A | 6/1990 | Takagi et al. |
| 5,064,718 A | 11/1991 | Buscall et al. |
| 5,077,147 A | 12/1991 | Tanaka et al. |
| 5,091,115 A | 2/1992 | Nogami et al. |
| 5,093,286 A | 3/1992 | Nogami et al. |
| 5,132,051 A | 7/1992 | Herron |
| 5,187,765 A | 2/1993 | Muehlemann et al. |
| 5,199,098 A | 3/1993 | Nolan et al. |
| 5,208,462 A | 5/1993 | O'Connor et al. |
| 5,260,957 A | 11/1993 | Hakimi et al. |
| 5,294,870 A | 3/1994 | Tang et al. |
| 5,422,489 A | 6/1995 | Bhargava |
| 5,434,878 A | 7/1995 | Lawandy |
| 5,442,254 A | 8/1995 | Jaskie |
| 5,455,489 A | 10/1995 | Bhargava |
| 5,470,910 A | 11/1995 | Spanhel et al. |
| 5,504,661 A | 4/1996 | Szpak |
| 5,527,386 A | 6/1996 | Statz |
| 5,534,056 A | 7/1996 | Kuehule et al. |
| 5,586,879 A | 12/1996 | Szpak |
| 5,599,897 A | 2/1997 | Nishiguchi et al. |
| 5,716,679 A | 2/1998 | Krug et al. |
| 5,717,289 A | 2/1998 | Tanaka |
| 5,777,433 A | 7/1998 | Lester et al. |
| 5,813,752 A | 9/1998 | Singer et al. |
| 5,813,753 A | 9/1998 | Vriens et al. |
| 5,847,507 A | 12/1998 | Butterworth et al. |
| 5,874,803 A | 2/1999 | Garbuzov et al. |
| 5,881,200 A | 3/1999 | Burt |
| 5,882,779 A | 3/1999 | Lawandy |
| 5,909,081 A | 6/1999 | Eida et al. |
| 5,917,279 A | 6/1999 | Elschner et al. |
| 5,955,528 A | 9/1999 | Sato et al. |
| 5,955,837 A | 9/1999 | Horikx et al. |
| 5,959,316 A | 9/1999 | Lowery et al. |
| 5,962,971 A | 10/1999 | Chen |
| 5,975,711 A | 11/1999 | Parker et al. |
| 5,982,092 A | 11/1999 | Chen |
| 5,988,822 A | 11/1999 | Abe et al. |
| 5,998,925 A | 12/1999 | Shimizu et al. |
| 6,005,707 A | 12/1999 | Berggren et al. |
| 6,023,371 A | 2/2000 | Onitsuka et al. |
| 6,048,616 A | 4/2000 | Gallagher et al. |
| 6,066,861 A | 5/2000 | Hohn et al. |
| 6,117,529 A | 9/2000 | Leising et al. |
| 6,236,493 B1 | 5/2001 | Schmidt et al. |
| 6,249,372 B1 | 6/2001 | Kobayashi et al. |
| 6,259,506 B1 | 7/2001 | Lawandy |
| 6,322,901 B1 | 11/2001 | Bawendi et al. |
| 6,340,824 B1 | 1/2002 | Komoto et al. |
| 6,358,652 B1 | 3/2002 | Tomiuchi et al. |
| 6,422,712 B1 | 7/2002 | Nousiainen et al. |
| 6,464,898 B1 | 10/2002 | Tomoike et al. |
| 6,473,554 B1 | 10/2002 | Pelka et al. |
| 6,482,664 B1 | 11/2002 | Kanekiyo |
| 6,501,091 B1 | 12/2002 | Bawendi et al. |
| 6,515,314 B1 | 2/2003 | Duggal et al. |
| 6,548,168 B1 | 4/2003 | Mulvaney et al. |
| 6,565,770 B1 | 5/2003 | Mayer et al. |
| 6,576,155 B1 | 6/2003 | Barbera-Guillem |
| 6,576,291 B2 | 6/2003 | Bawendi et al. |
| 6,577,073 B2 | 6/2003 | Shimizu et al. |
| 6,580,545 B2 | 6/2003 | Morrison et al. |
| 6,586,096 B2 | 7/2003 | Border et al. |
| 6,600,175 B1 | 7/2003 | Baretz et al. |
| 6,608,332 B2 | 8/2003 | Shimizu et al. |
| 6,608,439 B1 | 8/2003 | Sokolik et al. |
| 6,613,247 B1 | 9/2003 | Hohn et al. |
| 6,637,924 B2 | 10/2003 | Pelka et al. |
| 6,639,733 B2 | 10/2003 | Minano et al. |
| 6,641,755 B2 | 11/2003 | Tomoike et al. |
| 6,642,552 B2 | 11/2003 | Collins, III et al. |
| 6,650,044 B1 | 11/2003 | Lowery |
| 6,653,778 B1 | 11/2003 | Tomiuchi et al. |
| 6,677,610 B2 | 1/2004 | Choi et al. |
| 6,703,781 B2 | 3/2004 | Zovko |
| 6,710,366 B1 | 3/2004 | Lee et al. |
| 6,710,911 B2 | 3/2004 | LoCascio et al. |
| 6,714,711 B1 * | 3/2004 | Lieberman et al. ............ 385/124 |
| 6,731,359 B1 | 5/2004 | Fukaya |
| 6,734,465 B1 | 5/2004 | Taskar et al. |
| 6,744,077 B2 | 6/2004 | Trottier et al. |
| 6,744,960 B2 | 6/2004 | Pelka |
| 6,777,531 B2 | 8/2004 | Yasuda et al. |
| 6,777,706 B1 | 8/2004 | Tessler et al. |
| 6,781,148 B2 | 8/2004 | Kubota et al. |
| 6,784,603 B2 | 8/2004 | Pelka et al. |
| 6,791,259 B1 | 9/2004 | Stokes et al. |
| 6,794,686 B2 | 9/2004 | Chang et al. |
| 6,801,270 B2 * | 10/2004 | Faris et al. ..................... 349/61 |
| 6,803,719 B1 | 10/2004 | Miller et al. |
| 6,812,500 B2 | 11/2004 | Reeh et al. |
| 6,819,845 B2 | 11/2004 | Lee et al. |
| 6,821,559 B2 | 11/2004 | Eberspacher et al. |
| 6,830,835 B2 | 12/2004 | Saito et al. |
| 6,835,326 B2 | 12/2004 | Barbera-Guillem |
| 6,838,743 B2 | 1/2005 | Yamada et al. |
| 6,849,109 B2 | 2/2005 | Yadav et al. |
| 6,864,626 B1 | 3/2005 | Weiss et al. |
| 6,870,311 B2 | 3/2005 | Mueller et al. |
| 6,876,796 B2 | 4/2005 | Garito et al. |
| 6,885,033 B2 | 4/2005 | Andrews |
| 6,891,330 B2 | 5/2005 | Duggal et al. |
| 6,903,505 B2 | 6/2005 | McNulty et al. |
| 6,913,830 B2 | 7/2005 | Decker et al. |
| 6,914,106 B2 | 7/2005 | Leon et al. |
| 6,924,596 B2 | 8/2005 | Sato et al. |
| 6,955,855 B2 | 10/2005 | Naasani |
| 6,957,608 B1 | 10/2005 | Hubert et al. |
| 6,961,105 B2 | 11/2005 | Chang et al. |
| 7,005,667 B2 | 2/2006 | Chen et al. |
| 7,005,669 B1 | 2/2006 | Lee |
| 7,008,559 B2 | 3/2006 | Chen |
| 7,040,774 B2 | 5/2006 | Beeson et al. |
| 7,042,020 B2 | 5/2006 | Negley |
| 7,045,956 B2 | 5/2006 | Braune et al. |
| 7,046,439 B2 | 5/2006 | Kaminsky et al. |
| 7,065,285 B2 * | 6/2006 | Chen et al. .................... 385/141 |
| 7,066,623 B2 | 6/2006 | Lee et al. |
| 7,068,898 B2 | 6/2006 | Buretea et al. |
| 7,070,300 B2 | 7/2006 | Harbers et al. |
| 7,078,732 B1 | 7/2006 | Reeh et al. |
| 7,090,355 B2 | 8/2006 | Liu et al. |
| 7,091,653 B2 | 8/2006 | Ouderkirk et al. |
| 7,091,656 B2 | 8/2006 | Murazaki et al. |
| 7,102,152 B2 | 9/2006 | Chua et al. |
| 7,108,416 B1 | 9/2006 | Osawa |
| 7,123,796 B2 | 10/2006 | Steckl et al. |
| 7,126,162 B2 | 10/2006 | Reeh et al. |
| 7,129,515 B2 | 10/2006 | Okuyama et al. |
| 7,135,816 B2 | 11/2006 | Kawaguchi et al. |
| 7,144,131 B2 | 12/2006 | Rains |
| 7,166,010 B2 | 1/2007 | Lamansky et al. |
| 7,168,833 B2 | 1/2007 | Schottland et al. |
| 7,172,811 B2 | 2/2007 | Denisyuk et al. |
| 7,175,948 B2 | 2/2007 | Yoshihara et al. |
| 7,189,768 B2 | 3/2007 | Baran et al. |
| 7,190,870 B2 | 3/2007 | Sundar et al. |

(56) References Cited

U.S. PATENT DOCUMENTS

| | | |
|---|---|---|
| 7,196,354 B1 | 3/2007 | Erchak et al. |
| 7,199,393 B2 | 4/2007 | Park et al. |
| 7,213,940 B1 | 5/2007 | Van De Ven et al. |
| 7,235,792 B2 | 6/2007 | Elofson |
| 7,239,080 B2 | 7/2007 | Ng et al. |
| 7,242,030 B2 | 7/2007 | Wang et al. |
| 7,253,452 B2 | 8/2007 | Steckel et al. |
| 7,265,488 B2 | 9/2007 | Ng et al. |
| 7,273,309 B2 | 9/2007 | Ford et al. |
| 7,294,861 B2 | 11/2007 | Schardt et al. |
| 7,321,193 B2 | 1/2008 | Antoniadis et al. |
| 7,326,365 B2 | 2/2008 | Bawendi et al. |
| 7,350,933 B2 | 4/2008 | Ng et al. |
| 7,374,807 B2 | 5/2008 | Parce et al. |
| 7,393,618 B2 | 7/2008 | Ioku et al. |
| 7,420,323 B2 | 9/2008 | Krummacher |
| 7,430,355 B2 | 9/2008 | Heikenfeld et al. |
| 7,462,502 B2 | 12/2008 | Paolini et al. |
| 7,481,562 B2 | 1/2009 | Chua et al. |
| 7,495,383 B2 | 2/2009 | Chua et al. |
| 7,497,581 B2 | 3/2009 | Beeson et al. |
| 7,513,669 B2 | 4/2009 | Chua et al. |
| 7,534,002 B2 | 5/2009 | Yamaguchi et al. |
| 7,535,524 B2 | 5/2009 | Chua et al. |
| 7,546,013 B1 | 6/2009 | Santori et al. |
| 7,553,683 B2 | 6/2009 | Martin et al. |
| 7,554,257 B2 | 6/2009 | Krummacher et al. |
| 7,560,747 B2 | 7/2009 | Cok |
| 7,560,859 B2 * | 7/2009 | Saito et al. .................... 313/498 |
| 7,614,759 B2 | 11/2009 | Negley |
| 7,645,397 B2 | 1/2010 | Parce et al. |
| 7,682,850 B2 | 3/2010 | Harbers et al. |
| 7,686,493 B2 | 3/2010 | Roshan et al. |
| 7,692,373 B2 | 4/2010 | Bawendi et al. |
| 7,695,150 B2 | 4/2010 | Dejima et al. |
| 7,723,744 B2 | 5/2010 | Gillies |
| 7,791,271 B2 | 9/2010 | Cok et al. |
| 7,901,111 B2 | 3/2011 | Negley |
| 7,902,748 B2 | 3/2011 | Cok |
| 7,952,105 B2 | 5/2011 | Cok |
| 7,989,153 B2 | 8/2011 | Skipor et al. |
| 8,128,249 B2 | 3/2012 | Skipor et al. |
| 8,343,575 B2 | 1/2013 | Dubrow |
| 8,405,063 B2 | 3/2013 | Kazlas et al. |
| 2001/0001207 A1 | 5/2001 | Shimizu et al. |
| 2002/0021003 A1 | 2/2002 | McGrew |
| 2002/0071948 A1 | 6/2002 | Duff et al. |
| 2002/0127224 A1 | 9/2002 | Chen |
| 2002/0157574 A1 | 10/2002 | Weitzel et al. |
| 2002/0186921 A1 | 12/2002 | Schumacher et al. |
| 2003/0010987 A1 | 1/2003 | Banin et al. |
| 2003/0030706 A1 | 2/2003 | Jagannathan et al. |
| 2003/0044114 A1 | 3/2003 | Pelka |
| 2003/0048346 A1 | 3/2003 | Chow |
| 2003/0091933 A1 | 5/2003 | Kunita |
| 2003/0151700 A1 | 8/2003 | Carter et al. |
| 2003/0156425 A1 | 8/2003 | Turnbull et al. |
| 2003/0160260 A1 | 8/2003 | Hirai et al. |
| 2003/0227249 A1 | 12/2003 | Mueller et al. |
| 2004/0007169 A1 | 1/2004 | Ohtsu et al. |
| 2004/0067431 A1 | 4/2004 | Arney et al. |
| 2004/0091710 A1 | 5/2004 | Bawendi et al. |
| 2004/0110002 A1 | 6/2004 | Kim et al. |
| 2004/0131789 A1 | 7/2004 | Brown |
| 2004/0201664 A1 | 10/2004 | Bringley et al. |
| 2004/0203170 A1 | 10/2004 | Barbera-Guillem |
| 2004/0233139 A1 | 11/2004 | Asano et al. |
| 2004/0245912 A1 | 12/2004 | Thurk et al. |
| 2004/0262583 A1 | 12/2004 | Lee |
| 2005/0002635 A1 | 1/2005 | Banin et al. |
| 2005/0012076 A1 | 1/2005 | Morioka |
| 2005/0058416 A1 | 3/2005 | Hoon Lee et al. |
| 2005/0088079 A1 | 4/2005 | Daniels |
| 2005/0093422 A1 | 5/2005 | Wang et al. |
| 2005/0098787 A1 | 5/2005 | Andrews |
| 2005/0126628 A1 | 6/2005 | Scher et al. |
| 2005/0134723 A1 | 6/2005 | Lee et al. |
| 2005/0135079 A1 | 6/2005 | Yin Chua et al. |
| 2005/0139852 A1 | 6/2005 | Chen et al. |
| 2005/0142343 A1 | 6/2005 | Winkler et al. |
| 2005/0157996 A1 | 7/2005 | McCarthy et al. |
| 2005/0180680 A1 | 8/2005 | Kong |
| 2005/0185686 A1 | 8/2005 | Rupasov et al. |
| 2005/0214967 A1 | 9/2005 | Scher et al. |
| 2005/0236556 A1 | 10/2005 | Sargent et al. |
| 2005/0258418 A1 | 11/2005 | Steckel et al. |
| 2005/0261400 A1 | 11/2005 | Yang et al. |
| 2005/0265404 A1 | 12/2005 | Ashdown |
| 2005/0266246 A1 | 12/2005 | Reiss et al. |
| 2005/0272159 A1 | 12/2005 | Ismagilov et al. |
| 2005/0275615 A1 | 12/2005 | Kahen et al. |
| 2005/0279949 A1 | 12/2005 | Oldham et al. |
| 2006/0001036 A1 | 1/2006 | Jacob et al. |
| 2006/0002101 A1 | 1/2006 | Wheatley |
| 2006/0003097 A1 | 1/2006 | Andres et al. |
| 2006/0003114 A1 | 1/2006 | Enlow et al. |
| 2006/0003156 A1 | 1/2006 | Masutani et al. |
| 2006/0012853 A1 | 1/2006 | Tallone et al. |
| 2006/0024525 A1 | 2/2006 | Jeong et al. |
| 2006/0034065 A1 | 2/2006 | Thurk |
| 2006/0038182 A1 | 2/2006 | Rogers et al. |
| 2006/0040103 A1 | 2/2006 | Whiteford et al. |
| 2006/0057480 A1 | 3/2006 | Lin et al. |
| 2006/0060862 A1 | 3/2006 | Bawendi et al. |
| 2006/0063289 A1 | 3/2006 | Negley et al. |
| 2006/0066210 A1 | 3/2006 | Ng et al. |
| 2006/0068154 A1 | 3/2006 | Parce et al. |
| 2006/0071218 A1 | 4/2006 | Takeda et al. |
| 2006/0081862 A1 * | 4/2006 | Chua et al. .................... 257/98 |
| 2006/0103589 A1 | 5/2006 | Chua et al. |
| 2006/0105483 A1 | 5/2006 | Leatherdale et al. |
| 2006/0109682 A1 | 5/2006 | Ko et al. |
| 2006/0113895 A1 | 6/2006 | Baroky et al. |
| 2006/0128845 A1 | 6/2006 | Emrick et al. |
| 2006/0145599 A1 | 7/2006 | Stegamat et al. |
| 2006/0146565 A1 | 7/2006 | Lee |
| 2006/0147703 A1 | 7/2006 | Walker et al. |
| 2006/0157686 A1 | 7/2006 | Jang et al. |
| 2006/0157720 A1 | 7/2006 | Bawendi et al. |
| 2006/0169971 A1 | 8/2006 | Cho et al. |
| 2006/0196375 A1 | 9/2006 | Coe-Sullivan et al. |
| 2006/0197059 A1 | 9/2006 | Kram et al. |
| 2006/0197437 A1 | 9/2006 | Krummacher et al. |
| 2006/0199886 A1 | 9/2006 | Ryang |
| 2006/0204676 A1 | 9/2006 | Jones et al. |
| 2006/0204679 A1 | 9/2006 | Jones et al. |
| 2006/0210726 A1 | 9/2006 | Jones et al. |
| 2006/0214903 A1 | 9/2006 | Kurosaka |
| 2006/0215958 A1 | 9/2006 | Yeo |
| 2006/0216508 A1 | 9/2006 | Denisyuk et al. |
| 2006/0216759 A1 | 9/2006 | Naasani |
| 2006/0221021 A1 | 10/2006 | Hajjar et al. |
| 2006/0227546 A1 | 10/2006 | Yeo et al. |
| 2006/0238103 A1 | 10/2006 | Choi et al. |
| 2006/0238671 A1 | 10/2006 | Kim et al. |
| 2006/0240258 A1 | 10/2006 | Sato et al. |
| 2006/0244367 A1 | 11/2006 | Im et al. |
| 2006/0245710 A1 | 11/2006 | Borrelli et al. |
| 2006/0268571 A1 | 11/2006 | Harada et al. |
| 2006/0274226 A1 | 12/2006 | Im et al. |
| 2006/0279296 A1 | 12/2006 | Lee et al. |
| 2006/0291252 A1 | 12/2006 | Lim et al. |
| 2007/0012355 A1 | 1/2007 | LoCascio et al. |
| 2007/0012928 A1 | 1/2007 | Peng et al. |
| 2007/0012941 A1 | 1/2007 | Cheon |
| 2007/0013996 A1 | 1/2007 | Verma |
| 2007/0014318 A1 | 1/2007 | Hajjar et al. |
| 2007/0018102 A1 | 1/2007 | Braune et al. |
| 2007/0034833 A1 | 2/2007 | Parce et al. |
| 2007/0036510 A1 | 2/2007 | Ingman et al. |
| 2007/0036962 A1 | 2/2007 | Sasaki et al. |
| 2007/0045777 A1 | 3/2007 | Gillies et al. |
| 2007/0081329 A1 | 4/2007 | Chua et al. |
| 2007/0085092 A1 * | 4/2007 | Chen ............................ 257/89 |

(56) References Cited

U.S. PATENT DOCUMENTS

| | | |
|---|---|---|
| 2007/0087197 A1 | 4/2007 | Jang et al. |
| 2007/0090755 A1 | 4/2007 | Eida et al. |
| 2007/0096078 A1 | 5/2007 | Lee et al. |
| 2007/0096634 A1 | 5/2007 | Krummacher |
| 2007/0098160 A1 | 5/2007 | Lablans |
| 2007/0103068 A1 | 5/2007 | Bawendi et al. |
| 2007/0112097 A1 | 5/2007 | Olson et al. |
| 2007/0112101 A1 | 5/2007 | Choi et al. |
| 2007/0112118 A1 | 5/2007 | Park et al. |
| 2007/0115995 A1 | 5/2007 | Kim et al. |
| 2007/0121129 A1 | 5/2007 | Eida et al. |
| 2007/0131905 A1 | 6/2007 | Sato et al. |
| 2007/0145350 A1 | 6/2007 | Kobori |
| 2007/0164661 A1 | 7/2007 | Kuma |
| 2007/0170418 A1 | 7/2007 | Bowers et al. |
| 2007/0170447 A1 | 7/2007 | Negley et al. |
| 2007/0171188 A1 | 7/2007 | Waites |
| 2007/0200492 A1 | 8/2007 | Cok et al. |
| 2007/0201056 A1 | 8/2007 | Cok et al. |
| 2007/0223219 A1 | 9/2007 | Medendorp et al. |
| 2007/0235751 A1 | 10/2007 | Radkov et al. |
| 2007/0241661 A1 | 10/2007 | Yin |
| 2007/0263408 A1 | 11/2007 | Chua et al. |
| 2007/0281140 A1 | 12/2007 | Haubrich et al. |
| 2007/0298160 A1 | 12/2007 | Jang et al. |
| 2008/0001124 A1 | 1/2008 | Hachiya et al. |
| 2008/0001167 A1 | 1/2008 | Coe-Sullivan et al. |
| 2008/0001528 A1 | 1/2008 | Eida |
| 2008/0012031 A1 | 1/2008 | Jang et al. |
| 2008/0029710 A1 | 2/2008 | Sekiya et al. |
| 2008/0037282 A1 | 2/2008 | Kurihara |
| 2008/0048936 A1 | 2/2008 | Powell et al. |
| 2008/0057342 A1 | 3/2008 | Sekiya |
| 2008/0070153 A1 | 3/2008 | Ioku et al. |
| 2008/0074050 A1 | 3/2008 | Chen et al. |
| 2008/0085088 A1 | 4/2008 | Lin et al. |
| 2008/0144333 A1* | 6/2008 | Gourlay ............... 362/609 |
| 2008/0165235 A1 | 7/2008 | Rolly et al. |
| 2008/0169753 A1 | 7/2008 | Skipor et al. |
| 2008/0172197 A1 | 7/2008 | Skipor et al. |
| 2008/0173886 A1* | 7/2008 | Cheon et al. ............ 257/98 |
| 2008/0230120 A1 | 9/2008 | Reddy |
| 2008/0237540 A1 | 10/2008 | Dubrow |
| 2008/0246017 A1 | 10/2008 | Gillies et al. |
| 2008/0254210 A1 | 10/2008 | Lai et al. |
| 2008/0276817 A1 | 11/2008 | Hinch et al. |
| 2008/0277626 A1 | 11/2008 | Yang et al. |
| 2008/0308825 A1 | 12/2008 | Chakraborty et al. |
| 2009/0001385 A1 | 1/2009 | Skipor et al. |
| 2009/0017268 A1 | 1/2009 | Skipor et al. |
| 2009/0021148 A1 | 1/2009 | Hachiya et al. |
| 2009/0034292 A1 | 2/2009 | Pokrovskiy et al. |
| 2009/0050907 A1 | 2/2009 | Yuan et al. |
| 2009/0057662 A1 | 3/2009 | Brazis et al. |
| 2009/0059554 A1 | 3/2009 | Skipor et al. |
| 2009/0114932 A1 | 5/2009 | Chou |
| 2009/0140275 A1 | 6/2009 | Santori et al. |
| 2009/0152567 A1 | 6/2009 | Comerford et al. |
| 2009/0162011 A1 | 6/2009 | Coe-Sullivan et al. |
| 2009/0174022 A1 | 7/2009 | Coe-Sullivan et al. |
| 2009/0181478 A1 | 7/2009 | Cox et al. |
| 2009/0196160 A1 | 8/2009 | Crombach et al. |
| 2009/0208753 A1 | 8/2009 | Coe-Sullivan et al. |
| 2009/0212695 A1 | 8/2009 | Kim et al. |
| 2009/0215208 A1 | 8/2009 | Coe-Sullivan et al. |
| 2009/0215209 A1 | 8/2009 | Anc et al. |
| 2009/0236621 A1 | 9/2009 | Chakraborty |
| 2009/0251759 A1 | 10/2009 | Domash et al. |
| 2009/0263656 A1 | 10/2009 | Chae et al. |
| 2009/0278131 A1 | 11/2009 | Kwon et al. |
| 2009/0278141 A1 | 11/2009 | Coe-Sullivan et al. |
| 2009/0280586 A1 | 11/2009 | Coe-Sullivan et al. |
| 2009/0283743 A1 | 11/2009 | Coe-Sullivan et al. |
| 2009/0314991 A1 | 12/2009 | Cho et al. |
| 2009/0321755 A1 | 12/2009 | Jang et al. |
| 2010/0002414 A1 | 1/2010 | Meir et al. |
| 2010/0051898 A1 | 3/2010 | Kim et al. |
| 2010/0068468 A1 | 3/2010 | Coe-Sullivan et al. |
| 2010/0103648 A1 | 4/2010 | Kim et al. |
| 2010/0110728 A1 | 5/2010 | Dubrow et al. |
| 2010/0113813 A1 | 5/2010 | Pickett et al. |
| 2010/0123155 A1 | 5/2010 | Pickett et al. |
| 2010/0142183 A1 | 6/2010 | Lerenius |
| 2010/0144231 A1 | 6/2010 | Landry et al. |
| 2010/0155749 A1 | 6/2010 | Chen et al. |
| 2010/0167011 A1 | 7/2010 | Dubrow |
| 2010/0193806 A1 | 8/2010 | Byun |
| 2010/0208493 A1 | 8/2010 | Choi et al. |
| 2010/0243053 A1 | 9/2010 | Coe-Sullivan et al. |
| 2010/0246009 A1 | 9/2010 | Polley et al. |
| 2010/0265307 A1 | 10/2010 | Linton et al. |
| 2010/0283014 A1 | 11/2010 | Breen et al. |
| 2010/0283036 A1 | 11/2010 | Coe-Sullivan et al. |
| 2010/0283072 A1 | 11/2010 | Kazlas et al. |
| 2010/0314646 A1 | 12/2010 | Breen et al. |
| 2011/0081538 A1 | 4/2011 | Linton et al. |
| 2011/0103064 A1 | 5/2011 | Coe-Sullivan et al. |
| 2011/0186811 A1 | 8/2011 | Coe-Sullivan et al. |
| 2011/0199555 A1 | 8/2011 | Coe-Sullivan et al. |
| 2011/0233483 A1 | 9/2011 | Breen et al. |
| 2011/0309325 A1 | 12/2011 | Park et al. |
| 2012/0113672 A1 | 5/2012 | Dubrow et al. |

FOREIGN PATENT DOCUMENTS

| | | |
|---|---|---|
| EP | 1731583 | 12/2006 |
| EP | 1731583 A1 | 6/2007 |
| EP | 1909134 | 4/2008 |
| EP | 1912233 | 4/2008 |
| JP | 02-244104 | 9/1990 |
| JP | 04-229807 | 8/1992 |
| JP | 4238304 | 8/1992 |
| JP | 04-281433 | 10/1992 |
| JP | 05-152609 | 6/1993 |
| JP | 05-303017 | 11/1993 |
| JP | 06-163984 | 6/1994 |
| JP | 06-238161 | 8/1994 |
| JP | 06-301071 | 10/1994 |
| JP | 07-002912 | 1/1995 |
| JP | 07-176794 | 7/1995 |
| JP | 08-007614 | 1/1996 |
| JP | 08-007614 | 12/1996 |
| JP | 09-027642 | 1/1997 |
| JP | 09-050057 | 2/1997 |
| JP | 09-080434 | 3/1997 |
| JP | H-09304623 | 11/1997 |
| JP | 10-012925 | 1/1998 |
| JP | 11-224556 | 8/1999 |
| JP | 2002091352 | 3/2002 |
| JP | 2002-216962 | 8/2002 |
| JP | 2004-071357 | 3/2004 |
| JP | 2005-025970 | 1/2005 |
| JP | 2005038768 | 2/2005 |
| JP | 2006-073869 | 3/2006 |
| JP | 2006059723 | 3/2006 |
| JP | 2006073202 | 3/2006 |
| JP | 2006190679 | 7/2006 |
| JP | 2006278082 | 10/2006 |
| JP | 2007103099 | 4/2007 |
| JP | 2007103513 | 4/2007 |
| WO | WO 03/025539 | 3/2003 |
| WO | WO-03/070816 | 8/2003 |
| WO | WO-03/079414 | 9/2003 |
| WO | WO 2004/099664 A1 | 11/2004 |
| WO | WO-2006/104689 | 10/2006 |
| WO | WO-2007/002234 | 1/2007 |
| WO | WO-2007/009010 | 1/2007 |
| WO | WO-2007/046649 | 4/2007 |
| WO | WO 2007/117698 A2 | 10/2007 |
| WO | WO-2007/136816 | 11/2007 |
| WO | WO-2009/002512 | 12/2008 |
| WO | WO-2009/011922 | 1/2009 |
| WO | WO-2009/014590 | 1/2009 |
| WO | WO-2009/014707 | 1/2009 |

(56) References Cited

FOREIGN PATENT DOCUMENTS

| WO | WO-2009/035657 | 3/2009 |
|---|---|---|
| WO | WO-2009/137053 | 11/2009 |
| WO | WO-2009/145813 | 12/2009 |
| WO | WO-2009/151515 | 12/2009 |
| WO | WO-2010/014205 | 2/2010 |
| WO | WO 2010/014205 A1 | 2/2010 |
| WO | WO 2010/129350 | 11/2010 |
| WO | WO 2010/129374 | 11/2010 |
| WO | WO 2011/020098 | 2/2011 |
| WO | WO 2012/021643 | 2/2012 |

OTHER PUBLICATIONS

D.E. Fogg, et al, "Fabrication of Quantum Dot-Polymer Composites:Semiconductor Nanoclusters in Dual-Function Polymer Matrices with Electron-Transporting and Cluster-Passivating Properties" Macromolecules 1997, 30, 8433-8439.

N.C. Greenham, et al, "Charge seperation and transport in conjugated-polymer/semiconductor-nanocrystal composites studied by photoluminescense quenching and photoconductivity" Physical Review B vol. 54, No. 24, Dec. 15, 1996, pp. 17628-17637.

Margaret A. Hines, et al, "Synthesis and Characterization of strongly Luminescing ZnS-Capped CdSe Nanocrystals" J.Phys. Chem. 1996, 100, 468-471.

C.R. Kagan, et al, "Long-range resonance transfer of electronic excitations in close-packed CdSe Quantum-dot solids" Physical Review B vol. 54, No. 12 Sep. 15, 1996-II.

S.A. Empedocles, et al, "Photoluminescence Spectrosopy of Single CdSe nanocrystallite Quantum Dots" vol. 77, No. 18, Oct. 28, 1996.

F.V. Mikulec, et al, "Synthesis and Characterization of Highly Luminescent (CdSe)ZnS Quantum Dots" Met. Res. Soc. Symp. Proc. vol. 452 1997 Materials Research Society.

A.R. Kortan, et al, "Nucleation and Growth of CdSe on ZnS Quantum Crystallite Seeds, and Vice Versa in Inverse Micelle Media" Journal of the American Chemical Society, 1990, 112, 1327-1332.

C.B. Murray, et al, "Synthesis and Characterization of Nearly Monodisperse CdE (E=S, Se, Te) Semiconductor Nanocrystallites" 1993 American Chemical Society, 115.

A.V. Firth, et al., "Optical Properties of CdSe nanocrystals in a polymer matrix", Applied Physics Letters, vol. 75, No. 20, 3120 et seq. (1999).

S. Yanagida, et al., "Preparation of Quantized-CdS Doped Poly(Methyl Methacrylate) Films, Optical and Morphotogical Properties", Chem. Lett., pp. 1773-1776, 1990.

Office Action, dated Oct. 12, 2011, in related co-pending U.S. Appl. No. 12/655,074, filed Dec. 22, 2009 of John R. Linton et al.

Lin, J; et al., "Preparation of Highly Luminescent Nanocrystals and Their Application to Light-Emitting Diodes", Adv. Mater., 2007, 19, 1927-1932.

Shea Rohwer, L.E.; et al., "Development of solid state light sources based on II-VI semiconductor quantum dots", Proc. of SPIE vol. 5366, pp. 66 74.

Song, H.; et al., "Photoluminescent (CdSe)ZnS quantum dot-polymethylmethacrylate polymer composite thin films in the visible range", Nanotechnology 18 (2007) 055401 (6 pp).

Yamasaki, T., et al., "Organic Light-Emitting Device With an Ordered Monolayer of Silica Microspheres As a Scattering Medium", Appl. Phys. Lett. vol. 76, No. 10, Mar. 6, 2000, p. 1243 et seq.

Office Action, mailed Nov. 27, 2009, regarding U.S. Appl. No. 11/846,360, filed Aug. 28, 2007 (now US Patent No. 8,128,249), which is assigned to owner of the present application.

Fuchs, D.T., et al., "Making waveguides containing nanocrystalline quantum dots", Proc. of SPIE, vol. 5592 (SPIE Bellingham, WA 2005).

Olsson, Y.K., et al., "Fabrication and optical properties of polymeric waveguides containing nanocrystalline quantum dots", Appl., Phys. Lett., vol. 85, No. 19, Nov. 8, 2004, pp. 4469-4471.

Woelfle, C., et al., "Transparent and flexible quantum-dot polymer composites using an ionic liquid as compatible polymeriZation medium", Nanotechnology 18 (2007) 025402 (9 pp.).

Budriene, S., et al., "Preparation of lipophilic dye-loaded poly(vinyl alcohol) microcapsules and their characteristics", Chemija (Vilnius). 2002, T. 13, Nr. 2, 103-106.

Dabbousi et al., J. Phys. Chem. 101, 9463 (1997).

De Mello et al., Advanced Materials 9(3):230 (1997).

Green, P., et al., "Compare/Contrast of Thin Film EL (TFEL) to EL Backlighting, LED, and OLED Technologies", Dec. 13, 2007.

Kumar, A., et al., *Applied Physics Letters*, 63, 2002-2004, (1993).

Murray, Christopher, Ph.D. Thesis entitled "Synthesis and Characterization of II-VI Quantum Dots and Their Assembly into 3-D Quantum Dot Superlattices", Massachusetts Institute of Technology, Sep. 1995.

JP Notice of Rejection mailed May 8, 2012 (and English Translation) in counterpart Japanese Application No. 2010-514795 filed Dec. 24, 2009.

U.S. Office Action mailed Jan. 11, 2012 in copending U.S. Appl. No. 12/655,069, filed Dec. 22, 2009 of Linton, et al.

U.S. Office Action mailed Feb. 3, 2011 in copending U.S. Appl. No. 12/655,074, filed Dec. 22, 2009 of Breen, et al.

U.S. Office Action mailed May 14, 2012 in copending U.S. Appl. No. 12/657,282, filed Jan. 15, 2010 of Kazlas, et al.

U.S. Office Action mailed Nov. 14, 2012 in copending U.S. Appl. No. 12/655,069, filed Dec. 22, 2009 of Linton, et al.

Pang, et al., "PMMA Quantum Dots Composites Fabricated via use of Pre-polymerization", Optics Express, vol. 13, No. 1, Jan. 10, 2005.

PCT/US2008/08822 Search Report and Written Opinion—QD Vision, Inc., mailed Sep. 29, 2008.

PCT/US2008/07901 Search Report and Written Opinion—QD Vision, Inc., mailed Jan. 21, 2009.

PCT/US2008/08924 Search Report and Written Opinion—QD Vision, Inc., mailed Nov. 7, 2008.

PCT/US2007/008873 Search Report and Written Opinion—QD Vision, Inc., mailed Jan. 11, 2008.

Santhanam, V., et al., *Nano Letters*, 4, 41-44, (2004).

Yeh, C. in Kapany, N.S., et al, "Optical Waveguides", Jan. 1, 1972, Academic Press, New York, London, pp. 277-292.

Notice of Allowance mailed Feb. 20, 2013 in related U.S. Appl. No. 12/655,074.

Office Action mailed Mar. 22, 2013 in copending related U.S. Appl. No. 12/231,887.

JP Office Action dated Jan. 8, 2013 and received Feb. 6, 2013 in JP Patent Application No. 2010-0514794, which is the Japanese counterpart of related U.S. Appl. No. 12/655,074.

JP Office Action dated Dec. 25, 2012 and received Jan. 25, 2013 in JP Patent Application No. 2010-0517028, which is the Japanese counterpart of related U.S. Appl. No. 12/657,282.

European Patent Office Communication, dated Jul. 12, 2012, in European Patent Application No. 07 752 303.3, which is the EP counterpart of U.S. Appl. No. 12/231,887.

International Search Report on Patentability, dated Sep. 11, 2008, for PCT/US2008/07902.

International Report on Patentability, dated Sep. 9, 2008, for PCT/US2007/005589.

A. Akimov, et al, "Semiconductor nanocrystals in a polymeric matrix: new optical media" Opt. Spectrosc. 72 (4), Apr. 1992.

B.O. Dabbousi, et al, "Electronluminesscence from CdSe quantum-dot/polymer composites" Appl. Phys. Lett. 66 (11), Mar. 13, 1995.

D.E. Fogg, et al, Macromolecules Feb. 1997, 30, pp. 417-426.

N.C. Greenham, et al, "Charge seperation and transport in conjugated-polymer/semiconductor-nanocrystal composites studied by photoluminescence quenching and photoconductivity" Physical Review B vol. 54, No. 24, Dec. 15, 1996, pp. 17628-17637.

Margaret A. Hines, et al, "Synthesis and characterization of strongly LumInescing ZnS-Capped CdSe Nanocrystals" J. Phys. Chem. Jan. 1996, 100, 466-471.

C.R. Kagan, et al, "Long-range resonance transfer of electronic excitations In close-packed CdSe Quantum-dot solids" Physical Review B vol. 54, No. 12, Sep. 15, 1996-II.

S.A. Empedocles, et al, "Photoluminescence Spectrosopy of Single CdSe nanocrystalllte Quantum Dots" vol. 77, No. 18, Oct. 28, 1996.

(56) References Cited

OTHER PUBLICATIONS

F.V. Mikulec, et al, "Synthesis and Characterization of Highly Luminescent (CdSe)ZnS Quantum Dots" Met. Res. Soc. Symp. Proc. Vol. 452 1997 Materials Research Society, 1996 Fall Meeting.

A.R. Kortan, et al, "Nucleation and Growth of CdSe on ZnS Quantum Crystallite Seeds, and Vice Versa in Inverse Micelle Media" Journal of the American Chemical Society, 1990, 112, 1327-1332, Feb. 1990.

Horst Weller, "Quantized Semiconductor Particles: A Novel State of Matter for Materials Science" Adv. Mater. 1993. 5. No. 2, pp. 88-95.

Jinwook Lee, et al, "Full Color Emission from II-VI Semiconductor Quantum Dot-Polymer Composites" Adv. Mater. 2000, 12, No. 15, Aug. 2.

C.B. Murray, et al, "Synthesis and Characterization of Nearly Monodisperse CdE (E=4, Se, Te) Semiconductor Nanocrystallites" Nov. 1993 American Chemical Society, 115, pp. 8706-8715.

A.V. Firth, et al, "Optical Properties of CdSe nanocrystals in a polymer matrix", Applied Physics Letters, vol. 75, No. 20, 3120 et seq. (Nov. 1999).

S. Yanacida, et al., "Preparation of Quantized-CdS Doped Poly(Methyl Methacrylate) Films, Optical and Morphotogical Properties", Chem. Lett., pp. 1773-1776, Feb. 1990, vol. 19, No. 10.

Cao, Y.W., et al., "Growth and Properties of Semiconductor Core/Shell Nanocrystals with InAs Cores", J. Am. Chem. Soc. 2000, 122, 9692-0702.

Chason, M., et al."Free-Standing Quantum Dots for Electronic Applications", Proceedings of SPIE—Quantum Sensing and Nanophotonic Devices IV 2007, SPIE, US, Vo. 6479, Feb. 2, 2007, pp. 64790E-1-64790E-08, XP-002500571.

Dunlap, P.N., et al., "Design of Particulate Composites for Optical Applications", Polymer Composites, Feb. 1991, vol. 12, No. 1, pp. 39-47.

PCT/US2008/08036 Search Report and Written Opinion—QD Vision, Inc., mailed Sep. 10, 2008.

PCT/US2008/073127 Search Report and Written Opinion—(formerly Motorola, Inc., now QD Vision, Inc.), mailed Mar. 12, 2008.

PCT/US2009/002789 Search Report and Written Opinion—QD Vision, Inc., mailed Nov. 13, 2009.

PCT/US2009/002796 Search Report and Written Opinion—QD Vision, Inc., mailed Jun. 23, 2009.

PCT/US2009/04354 Search Report and Written Opinion—QD Vision, Inc., mailed Oct. 23, 2009.

US Office Action mailed Apr. 26, 2013 in copending U.S. Appl. No. 12/940,355.

US Office Action mailed Mar. 19, 2013 in copending U.S. Appl. No. 12/944,681.

Final rejection in counterpart Japanese Patent Application No. JP-2010514795, dated Aug. 6, 2013.

Final rejection in counterpart Japanese Patent Application No. JP-2010514795, dated Aug. 6, 2013. English translation.

Office Action in copending U.S. Appl. No. 12/940,343, dated Aug. 13, 2013.

Office Action in copending U.S. Appl. No. 12/944,681, dated Mar. 19, 2013.

\* cited by examiner

1) Light source
2) Waveguide component
3) Layer comprising quantum confined semiconductor nanoparticles 1) Light source
2) Waveguide component comprising quantum confined semiconductor nanoparticles dispersed or embedded therein

US 8,718,437 B2

COMPOSITIONS, OPTICAL COMPONENT, SYSTEM INCLUDING AN OPTICAL COMPONENT, DEVICES, AND OTHER PRODUCTS

This application is a continuation-in-part application of commonly owned International Application No. PCT/US2008/007902, filed 25 Jun. 2008. The PCT Application claims priority from commonly owned U.S. Patent Application No. 60/946,090, filed 25 Jun. 2007; U.S. Patent Application No. 60/949,306, filed 12 Jul. 2007; U.S. Patent Application No. 60/946,382, filed 26 Jun. 2007; U.S. Patent Application No. 60/971,885, filed 12 Sep. 2007; U.S. Patent Application No. 60/973,644, filed 19 Sep. 2007; and U.S. Patent Application No. 61/016,227, filed 21 Dec. 2007. The disclosures of each of the foregoing applications are hereby incorporated herein by reference in their entireties. The PCT Application also claims priority to U.S. Application No. 60/950,598 filed 18 Jul. 2007.

This application is also a continuation-in-part application of commonly owned U.S. patent application Ser. No. 12/231,887, filed 5 Sep. 2008, which is a continuation of commonly owned PCT Application No. PCT/US2007/005589 filed 6 Mar. 2007, which was published in the English language as PCT Publication No. WO 2007/103310 on 13 Sep. 2007. PCT Application No. PCT/US2007/005589 claims priority from commonly owned U.S. Application No. 60/779,740 filed 7 Mar. 2006.

TECHNICAL FIELD OF THE INVENTION

The present invention relates to the technical fields of optical components, systems including optical components, devices including optical components, and compositions useful in the foregoing.

SUMMARY OF THE INVENTION

In accordance with one aspect of the present invention, there is provided an optical component including a waveguide component comprising from about 0.001 to about 15 weight percent quantum confined semiconductor nanoparticles based on the weight of the waveguide component. In certain embodiments, the waveguide component is transparent to the light coupled to the waveguide component from a light source and to light emitted by the nanoparticles. In certain embodiments, the optical component further includes a filter layer disposed over and/or under the nanoparticles. In certain embodiments, the waveguide component further includes scatterers in an amount in the range from about 0.001 to about 15 weight percent of the weight of the waveguide component. In certain embodiments, the nanoparticles comprise a core/shell structure. In certain embodiments, the waveguide component is adapted for having a light source optically coupled thereto. In certain embodiments, the nanoparticles are included in a layer disposed over a predetermined region of a surface of the waveguide component. In certain embodiments, the layer comprising nanoparticles has a thickness from about 0.1 to about 200 microns. In certain embodiments, the layer comprising nanoparticles is sufficiently thick so as to absorb light incident thereon. In certain embodiments, the layer further comprises a host material in which the quantum confined semiconductor nanoparticles are distributed. In certain embodiments, the quantum confined semiconductor nanoparticles are included in a composition further including a host material, wherein the composition includes from about 0.001 to about 15 weight percent quantum confined semiconductor nanoparticles based on the weight of the host material. Preferably the host material comprises a solid (as opposed to a liquid) material. In certain embodiments, the nanoparticles are included in a predetermined arrangement disposed over a predetermined region of a surface of the waveguide component. In certain embodiments, the composition is included in a predetermined arrangement disposed over a predetermined region of a surface of the waveguide component. In certain embodiments, the nanoparticles are embedded in a predetermined region of the waveguide component in a predetermined arrangement. In certain embodiments, the predetermined arrangement has a thickness from about 0.1 to about 200 microns.

In accordance with another aspect of the invention, there is provided an optical component including a waveguide component including a composition comprising quantum confined semiconductor nanoparticles and a host material, wherein the composition includes from about 0.001 to about 15 weight percent quantum confined semiconductor nanoparticles based on the weight of the host material. In certain embodiments, the composition further comprises scatterers. In certain embodiments, the scatterers are included in the composition in an amount in the range from about 0.001 to about 15 weight percent of the weight of the host material. Preferably the host material comprises a solid (as opposed to a liquid) material. In certain embodiments, the composition is disposed in a predetermined arrangement over a predetermined region of a surface of the waveguide component. In certain embodiments, the predetermined arrangement has a thickness from about 0.1 to about 200 microns. In certain embodiments, the composition is embedded in a predetermined region of the waveguide component in a predetermined arrangement. In certain embodiments, the optical component further includes means for coupling light from a light source into the waveguide component.

In accordance with another aspect of the present invention, there is provided an optical component including a waveguide component including a layer comprising quantum confined semiconductor nanoparticles and a host material, wherein the layer includes from about 0.001 to about 15 weight percent quantum confined semiconductor nanoparticles based on the weight of the host material. Preferably the host material comprises a solid (as opposed to a liquid) material. In certain embodiments, the layer further comprises scatterers. In certain embodiments, the scatterers are included in the layer in an amount in the range from about 0.001 to about 15 weight percent of the weight of the host material. In certain embodiments, the optical component further includes means for coupling light from a light source into the waveguide component.

In accordance with another aspect of the invention, there is provided an optical component comprising a film including a carrier substrate including quantum confined semiconductor nanoparticles in a predetermined arrangement over a predetermined region of a surface thereof, wherein the film is attached to a surface of a waveguide component. In certain embodiments, the optical component further includes means for coupling light from a light source into a waveguide component. In certain embodiments, the film includes from about 0.001 to about 15 weight percent quantum confined semiconductor nanoparticles based on the weight of the film. In certain embodiments, the film comprises a film taught herein. In certain embodiments, the film comprises a decal.

In accordance with another aspect of the present invention, there is provided an optical component comprising a film including a carrier substrate including a composition comprising quantum confined semiconductor nanoparticles and a host material, wherein the composition is disposed in a predetermined arrangement over a predetermined region of a surface thereof and wherein the film is attached to a surface of a waveguide component. In certain embodiments, the composition includes from about 0.001 to about 15 weight percent quantum confined semiconductor nanoparticles based on the weight of the host material. Preferably the host material comprises a solid (as opposed to a liquid) material. In certain embodiments, the composition further comprises scatterers. In certain embodiments, scatterers are included in the composition in an amount in the range from about 0.001 to about 15 weight percent of the weight of the host material. In certain embodiments, the film comprises a decal.

In accordance with another aspect of the present invention, there is provided a system comprising an optical component including a waveguide component comprising from about 0.001 to about 15 weight percent quantum confined semiconductor nanoparticles based on the weight of the waveguide component and a light source optically coupled to the waveguide component. In certain embodiments, the light source is optically coupled to an edge of the waveguide component. In certain embodiments, the light source is optically coupled to a surface of the waveguide component. In certain embodiments, the nanoparticles are included in a predetermined arrangement disposed over a surface of the waveguide component. In certain embodiments, the nanoparticles are included in a layer disposed over a surface of the waveguide components. In certain embodiments, the quantum confined semiconductor nanoparticles included in a layer are arranged in one or more predetermined arrangements. In certain embodiments, the layer further comprises a host material in which the quantum confined semiconductor nanoparticles are distributed. In certain embodiments, the layer further comprises scatterers. In certain embodiments, the nanoparticles are included in the layer in an amount in the range from about 0.001 to about 15 weight percent of the weight of the host material. Preferably the host material comprises a solid (as opposed to a liquid) material.

In accordance with another aspect of the present invention, there is provided a system comprising an optical component including a film in taught herein disposed over a waveguide component and a light source optically coupled to the waveguide component. In certain embodiments, the film comprises a decal.

In accordance with another aspect of the present invention, there is provided a system comprising an optical component including a waveguide component including a composition comprising quantum confined semiconductor nanoparticles and a host material, wherein the layer includes from about 0.001 to about 15 weight percent quantum confined semiconductor nanoparticles based on the weight of the host material and a light source optically coupled to the waveguide component. Preferably the host material comprises a solid (as opposed to a liquid) material. In certain embodiments, the composition further comprises scatterers.

In certain embodiments, a system can include two or more optical components taught herein and one or more lights sources. In certain of such embodiments, the optical components are preferably arranged such that the waveguide component of each is parallel to that of each other optical component, and each optical component is coupled to a separate light source. In certain of such embodiments, the optical components are preferably optically separated from each such that there is no "optical communication" or "cross-talk" between the optical components. In certain of such embodiments, such separation can be achieved by an air gap due to physical spacing between the components or by a layer of low index of refraction material. Other suitable techniques of optical separation can also be used. In certain embodiments, each optical component is coupled to a separate light source.

In accordance with another aspect of the present invention, there is provided a device including an optical component taught herein.

In accordance with another aspect of the present invention, there is provided a device including a film taught herein.

In accordance with another aspect of the present invention, there is provided a device including a system taught herein.

In certain embodiments, a device comprises a display. In certain embodiments, a device comprises a solid state lighting device or other lighting unit. In certain embodiments, a device comprises a sign. In certain embodiments, a device comprises a photovoltaic device. In certain embodiments, a device comprises another electronic or optoelectronic device.

In accordance with another aspect of the present invention, there is provided a composition useful for altering the wavelength of visible or invisible light, the composition comprising a host material and quantum confined semiconductor nanoparticles, wherein the nanoparticles are included in the composition in amount in the range from about 0.001 to about 15 weight percent based on the weight of the host material. Preferably the host material comprises a solid (as opposed to a liquid) material. In certain embodiments, the composition further includes scatterers in amount in the range from about 0.001 to about 15 weight percent based on the weight of the host material. In certain embodiments, at least a portion of the nanoparticles include a ligand on a surface thereof wherein the ligand has an affinity for the host material.

In accordance with another aspect of the present invention, there is provided a film comprising a carrier substrate including a predetermined arrangement of quantum confined semiconductor nanoparticles over a predetermined portion of a surface thereof. In certain embodiments, the nanoparticles are included in a layer disposed over a surface of the film. In certain embodiments, the quantum confined semiconductor nanoparticles included in a layer are arranged in one or more predetermined arrangements. In certain embodiments, the carrier substrate comprises a substantially optically transparent material. In certain embodiments, the film includes from about 0.001 to about 15 weight percent quantum confined semiconductor nanoparticles based on the weight of the film. In certain embodiments, the predetermined arrangement further comprises scatterers. In certain embodiments, the nanoparticles are included in a host material. In certain embodiments, the nanoparticles are included in the composition in amount in the range from about 0.001 to about 15 weight percent based on the weight of the host material. Preferably the host material comprises a solid (as opposed to a liquid) material. In certain embodiments, the composition further comprises scatterers. In certain embodiments, the film comprises a decal. In certain embodiments, the film is adapted to be fixedly attached to a surface. In certain embodiments, the film is adapted to be removably attached to a surface. In certain embodiments, a film is included in an optical component wherein it is attached to a surface of a waveguide component. In certain embodiments, additional layers and/or features (including, but not limited to, filters, reflective layers, coupling means, etc.) are also included. In certain embodiments, a film is included in a device.

In accordance with another aspect of the present invention, there is provided a kit comprising a light source adapted for being optically coupled to a waveguide component and one or more films, wherein at least one film comprises a carrier substrate including quantum confined semiconductor nanoparticles disposed over a surface thereof. In certain embodiments, the nanoparticles are disposed in a predetermined arrangement over a predetermined region of the carrier substrate. In certain embodiments, the film includes from about 0.001 to about 15 weight percent quantum confined semiconductor nanoparticles based on the weight of the film. In certain embodiments, the nanoparticles are included in a host material. In certain embodiments, the nanoparticles are included in the host material in amount in the range from about 0.001 to about 15 weight percent based on the weight of the host material. Preferably the host material comprises a solid (as opposed to a liquid) material. In certain embodiments, the host material further comprises scatterers. In certain embodiments, the film comprises a decal. In certain embodiments, the film is adapted to be fixedly attached to a surface. In certain embodiments, the film is adapted to be removably attached to a surface. In certain embodiments, a kit includes a light source adapted for being optically coupled to a waveguide component and one or more films, wherein at least one film comprises a film taught herein including nanoparticles disposed on a surface of the carrier substrate. In certain embodiments, a kit further includes a waveguide component.

In accordance with another aspect of the present invention, there is provided a method for making a sign comprising applying a film taught herein to a surface of a member having light waveguiding capability, coupling light into a surface or edge of the member such that the light is waveguided within the member to optically excite the quantum confined semiconductor nanoparticles included directly or indirectly on the carrier substrate. In certain embodiments, the member comprises a window or other structural, decorative, architectural, or other structure or element fabricated from a material with waveguiding capability. In certain embodiments, the film comprises a decal. The film may be adhered permanently to the surface of the member through use of an optical adhesive, or be repositionable by employing a non-permanent adhesive or a "static cling" film.

In accordance with another aspect of the present invention, there is provided a thin film electroluminescent lamp comprising quantum confined semiconductor nanoparticles disposed over a surface thereof. In certain embodiments, the nanoparticles are disposed in a predetermined arrangement over a predetermined region of the surface of the lamp. In certain embodiments, the nanoparticles are included in a host material. In certain embodiments, the host material further includes scatterers. In certain embodiments, the host material includes from about 0.001 to about 15 weight percent quantum confined semiconductor nanoparticles based on the weight of the host material. Preferably the host material comprises a solid (as opposed to a liquid) material. In certain embodiments, the nanoparticles are included in a layer disposed over a surface of the lamp. In certain embodiments, the layer further comprises a host material in which the quantum confined semiconductor nanoparticles are distributed. In certain embodiments, the quantum confined semiconductor nanoparticles included in a layer are arranged in one or more predetermined arrangements. In certain embodiments, the layer further includes scatterers. In certain embodiments, the layer further includes a host material, wherein the layer includes from about 0.001 to about 15 weight percent quantum confined semiconductor nanoparticles based on the weight of the host material. In certain embodiments, the host material further includes scatterers. In certain embodiments, the scatterers are included in amount in the range from about 0.001 to about 15 weight percent based on the weight of the host material. In certain embodiments, the scatterers are included in amount in the range from about 0.1 to 2 weight percent based on the weight of the host material. In certain embodiments, the weight ratio of quantum confined semiconductor nanoparticles to scatterers is from about 1:100 to about 100:1. In certain embodiments, the lamp can further include one or more filter layers. Such filters can be disposed over and/or under the nanoparticles. In certain embodiments, the lamp further includes one or more reflective layers. In certain embodiments, the lamp further includes outcoupling features on a surface of the lamp over which the nanoparticles are disposed. In certain embodiments, the lamp further includes outcoupling features over the nanoparticles. In certain embodiments, additional layers and/or features (including, but not limited to, filters, reflective layers, coupling means, brightness enhancing films, etc.) are also included. In certain embodiments, a TFEL lamp includes a film taught herein over surface thereof. In certain embodiments, the film comprises a decal.

In accordance with another aspect of the invention, there is provided an ink composition comprising quantum confined semiconductor nanoparticles and a liquid vehicle, wherein the liquid vehicle comprises a composition including one or more functional groups that are capable of being cross-linked. In certain embodiments, the functional units can be cross-linked by UV treatment. In certain embodiments, the functional units can be cross-linked by thermal treatment. In certain embodiments, the functional units can be cross-linked by other cross-linking technique readily ascertainable by a person of ordinary skill in a relevant art. In certain embodiments, the composition including one or more functional groups that are capable of being cross-linked can be the liquid vehicle itself. In certain embodiments, it can be a co-solvent. In certain embodiments, it can be a component of a mixture with the liquid vehicle. In certain embodiments, the ink can further include scatterers.

In certain embodiments, the transition of ink from a liquid to a solid occurs merely by the evaporation of solvent, and no cross-linking occurs.

In accordance with another aspect of the invention, there is provided an ink composition comprising quantum confined semiconductor nanoparticles, a liquid vehicle, and scatterers.

In accordance with other aspects of the present invention, there are provided devices including a composition and/or ink composition taught herein. In certain embodiments, the ink and/or or composition is included in a component of the device. In certain embodiments, the ink and/or composition is included on a surface of a component. In certain embodiments, the ink and/or composition can be included as a layer in the device. In certain embodiments, the ink and/or composition is included on a top and/or bottom surface of the device. The ink and/or composition can be included in a predetermined arrangement over a predetermined region of the surface on which it is disposed. Such arrangement can be patterned or unpatterned, in accordance with the particular application. In certain embodiments, more than one predetermined arrangement is included. In certain embodiments, the device comprises a display, a solid state lighting device, another light emitting device, a photovoltaic device, or other electronic or optoelectronic device.

The foregoing, and other aspects and embodiments described herein and contemplated by this disclosure all constitute embodiments of the present invention.

It is to be understood that both the foregoing general description and the following detailed description are exemplary and explanatory only and are not restrictive of the invention as claimed. Other embodiments will be apparent to those skilled in the art from consideration of the specification and practice of the invention disclosed herein.

Figure 1:
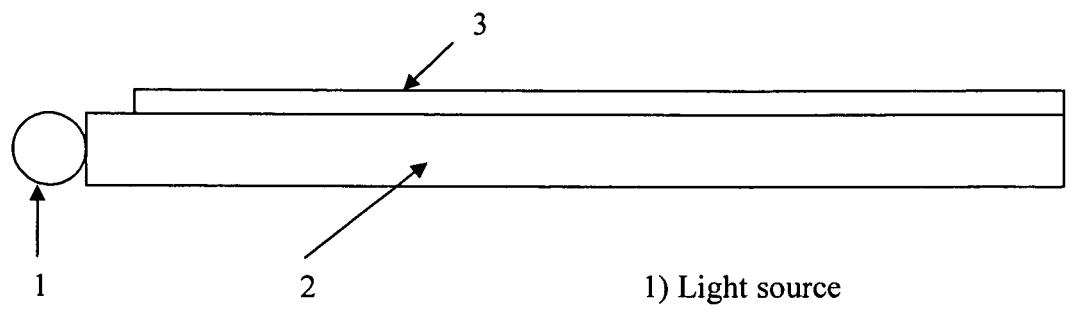
FIG. 1 is a schematic drawing depicting an example of an embodiment of a system including an optical component in accordance with the invention.

The attached figures are simplified representations presented for purposes of illustration only; the actual structures may differ in numerous respects, particularly including the relative scale of the articles depicted and aspects thereof.

For a better understanding to the present invention, together with other advantages and capabilities thereof, reference is made to the following disclosure and appended claims in connection with the above-described drawings.

DETAILED DESCRIPTION OF THE INVENTION

In accordance with one aspect of the invention, there is provided a composition comprising a host material and quantum confined semiconductor nanoparticles, wherein the nanoparticles are included in the composition in amount in the range from about 0.001 to about 15 weight percent based on the weight of the host material.

In certain preferred embodiments, the composition includes from about 0.01 to about 10 weight percent quantum confined semiconductor nanoparticles based on the weight of the host material. In certain more preferred embodiments, the composition includes from about 0.01 to about 5 weight percent quantum confined semiconductor nanoparticles based on the weight of the host material. In certain most preferred embodiments, the composition includes from about 0.1 to about 3 weight percent quantum confined semiconductor nanoparticles based on the weight of the host material. In certain of such most preferred embodiments, the composition includes from about 0.1 to about 2 weight percent quantum confined semiconductor nanoparticles based on the weight of the host material.

In certain embodiments, the quantum confined semiconductor nanoparticles comprise semiconductor nanocrystals. In certain embodiments, the semiconductor nanocrystals comprise a core/shell structure.

In certain embodiments, the composition further includes scatterers. In certain embodiments, the scatterers are also included in the composition in amount in the range from about 0.001 to about 15 weight percent based on the weight of the host material. In certain embodiments, the scatterer concentration is from about 0.1 to 2 weight percent based on the weight of the host material. In certain embodiments, the weight ratio of quantum confined semiconductor nanoparticles to scatterers is from about 1:100 to about 100:1.

Examples of scatterers (also referred to herein as light scattering particles) that can be used in the embodiments and aspects of the inventions contemplated by this disclosure include, without limitation, metal or metal oxide particles, air bubbles, and glass and polymeric beads (solid or hollow). Other scatterers can be readily identified by those of ordinary skill in the art. In certain embodiments, scatterers have a spherical shape. Preferred examples of scattering particles include, but are not limited to, $TiO_2$, $SiO_2$, $BaTiO_3$, $BaSO_4$, and $ZnO$. Particles of other materials that are non-reactive with the host material and that can increase the absorption pathlength of the excitation light in the host material can be used. Additionally, scatterers that aid in the out-coupling of the down-converted light may be used. These may or may not be the same scatterers used for increasing the absorption pathlength. In certain embodiments, the scatterers may have a high index of refraction (e.g., $TiO_2$, $BaSO_4$, etc) or a low index of refraction (gas bubbles). Preferably the scatterers are not luminescent.

Selection of the size and size distribution of the scatterers is readily determinable by those of ordinary skill in the art. The size and size distribution is preferably based upon the refractive index mismatch of the scattering particle and the host material in which it the scatterer is to be dispersed, and the preselected wavelength(s) to be scattered according to Rayleigh scattering theory. The surface of the scattering particle may further be treated to improve dispersability and stability in the host material. In one embodiment, the scattering particle comprises $TiO_2$ (R902+ from DuPont) of 0.2 μm particle size, in a concentration in a range from about 0.001 to about 20% by weight. In certain preferred embodiments, the concentration range of the scatterers is between 0.1% and 10% by weight. In certain more preferred embodiments, a composition includes a scatterer (preferably comprising $TiO_2$) at a concentration in a range from about 0.1% to about 5% by weight, and most preferably from about 0.3% to about 3% by weight.

Examples of a host material useful in various embodiments and aspect of the inventions described herein include polymers, monomers, resins, binders, glasses, metal oxides, and other nonpolymeric materials. In certain embodiments, the host material is non-photoconductive. In certain embodiments, an additive capable of dissipating charge is further included in the host material. In certain embodiments, the charge dissipating additive is included in an amount effective to dissipate any trapped charge. In certain embodiments, the host material is non-photoconductive and further includes an additive capable of dissipating charge, wherein the additive is included in an amount effective to dissipate any trapped charge. Preferred host materials include polymeric and non-polymeric materials that are at least partially transparent, and preferably fully transparent, to preselected wavelengths of visible and non-visible light. In certain embodiments, the preselected wavelengths can include wavelengths of light in the visible (e.g., 400-700 nm), ultraviolet (e.g., 10-400 nm), and/or infrared (e.g., 700 nm-12 μm) regions of the electromagnetic spectrum. Preferred host materials include cross-linked polymers and solvent-cast polymers. Examples of preferred host materials include, but are not limited to, glass or a transparent resin. In particular, a resin such as a non-curable resin, heat-curable resin, or photocurable resin is suitably used from the viewpoint of processability. As specific examples of such a resin, in the form of either an oligomer or a polymer, a melamine resin, a phenol resin, an alkyl resin, an epoxy resin, a polyurethane resin, a maleic resin, a polyamide resin, polymethyl methacrylate, polyacrylate, polycarbonate, polyvinyl alcohol, polyvinylpyrrolidone, hydroxyethylcellulose, carboxymethylcellulose, copolymers containing monomers forming these resins, and the like. Other suitable host materials can be identified by persons of ordinary skill in the relevant art.

In certain embodiments and aspects of the inventions contemplated by this disclosure, a host material comprises a photocurable resin. A photocurable resin may be a preferred host material in certain embodiments in which the composition is to be patterned. As a photo-curable resin, a photo-polymerizable resin such as an acrylic acid or methacrylic acid based resin containing a reactive vinyl group, a photo-crosslinkable resin which generally contains a photo-sensitizer, such as polyvinyl cinnamate, benzophenone, or the like may be used. A heat-curable resin may be used when the photo-sensitizer is not used. These resins may be used individually or in combination of two or more.

In certain embodiments and aspects of the invention contemplated by this disclosure, a host material comprises a solvent-cast resin. A polymer such as a polyurethane resin, a maleic resin, a polyamide resin, polymethyl methacrylate, polyacrylate, polycarbonate, polyvinyl alcohol, polyvinylpyrrolidone, hydroxyethylcellulose, carboxymethylcellulose, copolymers containing monomers forming these resins, and the like can be dissolved in solvents known to those skilled in the art. Upon evaporation of the solvent, the resin forms a solid host material for the semiconductor nanoparticles. In certain embodiments, the composition including quantum confined semiconductor nanoparticles and a host material can be formed from an ink composition comprising quantum confined semiconductor nanoparticles and a liquid vehicle, wherein the liquid vehicle comprises a composition including one or more functional groups that are capable of being cross-linked. The functional units can be cross-linked, for example, by UV treatment, thermal treatment, or another cross-linking technique readily ascertainable by a person of ordinary skill in a relevant art. In certain embodiments, the composition including one or more functional groups that are capable of being cross-linked can be the liquid vehicle itself. In certain embodiments, it can be a co-solvent. In certain embodiments, it can be a component of a mixture with the liquid vehicle. In certain embodiments, the ink can further include scatterers.

In certain embodiments of the inventions contemplated by this disclosure, quantum confined semiconductor nanoparticles (e.g., semiconductor nanocrystals) are distributed within the host material as individual particles.

In certain embodiments of the inventions contemplated by this disclosure, quantum confined semiconductor nanoparticles distributed within the host material may include flocculated (or aggregated) particles.

In certain embodiments of the inventions contemplated by this disclosure, quantum confined semiconductor nanoparticles may be included within or adsorbed onto host particles. These host particles may be polymeric or inorganic. These host particles can be dispersed within or on top of the host material.

In accordance with another aspect of the invention, there is provided a film comprising a carrier substrate including a predetermined arrangement of quantum confined semiconductor nanoparticles over a predetermined region of a surface thereof. In certain embodiments, the film includes from about 0.001 to about 15 weight percent quantum confined semiconductor nanoparticles based on the weight of the film.

In certain embodiments, the quantum confined semiconductor nanoparticles are included directly or indirectly on a predetermined region of a surface of the carrier substrate in a predetermined arrangement.

In certain embodiments, the quantum confined semiconductor nanoparticles are included in the host material in an amount in the range from about 0.001 to about 15 weight percent of the weight of the host material. Preferably the host material comprises a solid (as opposed to a liquid) material. In certain embodiments, scatterers are included with the nanoparticles.

In certain embodiments, the quantum confined semiconductor nanoparticles are included in a layer disposed over a surface of the film. In certain embodiments, the quantum confined semiconductor nanoparticles included in a layer are arranged in one or more predetermined arrangements. In certain embodiments, the layer further comprises a host material in which the quantum confined semiconductor nanoparticles are distributed.

In certain embodiments, additional layers and/or features (including, but not limited to, filters, reflective layers, coupling means, etc.) are also included. Examples of various additional layers and/or features discussed herein for inclusion in an optical component or with a waveguide components can also be included in a film. In certain embodiments, the film comprises a decal.

In accordance with another aspect of the invention, there is provided an optical component comprising a waveguide component and quantum confined semiconductor nanoparticles. In certain embodiments, quantum confined semiconductor nanoparticles can be included in a host material. In certain embodiments, the quantum confined semiconductor nanoparticles are included in a composition in accordance with the present invention.

In certain embodiments, the quantum confined semiconductor nanoparticles are included directly or indirectly on a predetermined region of a surface of the waveguide component in a predetermined arrangement.

In the various aspects and embodiments of the inventions contemplated by this disclosure, a predetermined arrangement can be of any configuration or content. For example, the predetermined arrangement can display any type of image (e.g., logo, design, picture, other graphics, text (e.g., letters, words, numbers, combinations of letter, words and/or numbers), and/or combinations thereof (e.g., a combination of a logo, design, picture, other graphics, and/or text). Alternatively, the predetermined arrangement can be a layer that fully or partially covers a predetermined region. In certain embodiments, a second predetermined arrangement can be further disposed over and/or under a first predetermined arrangement. In certain embodiments, the second predetermined arrangement comprises quantum confined semiconductor nanoparticles. In certain embodiments including more than one predetermined arrangement, a predetermined arrangement can comprise an opaque or other non-emissive material that can useful, for example, the brightness of the quantum confined semiconductor nanoparticle background layer can enhance the details, contrast or other visibility aspects of one or more of any other predetermined arrangement. The predetermined arrangement is typically disposed over a surface of a component or device that is viewable when the component or device is in use, whether or not included in or on another device, product, or other article.

In certain embodiments including two or more predetermined arrangements, the arrangements may be positioned to have different orientations. For example, one may be positioned for intended viewing in a first orientation, and another is positioned for intended viewing at a second orientation, e.g., at a 90 degree rotation from the first.

Quantum confined semiconductor nanoparticles can confine electrons and holes and have a photoluminescent property to absorb light and re-emit different wavelength light. Color characteristics of emitted light from quantum confined semiconductor nanoparticles depend on the size of the quantum confined semiconductor nanoparticles and the chemical composition of the quantum confined semiconductor nanoparticles.

In certain embodiments, the quantum confined semiconductor nanoparticles include at least one type of quantum confined semiconductor nanoparticle with respect to chemical composition and size. The type(s) of quantum confined semiconductor nanoparticles included in one of the aspects or embodiments of the inventions contemplated by this disclosure are determined by the wavelength of light to be converted and the wavelengths of the desired light output. As discussed herein, quantum confined semiconductor nanoparticles may or may not include a shell and/or a ligand on a surface thereof. A shell and/or ligand on quantum confined semiconductor nanoparticles can serve to passivate non-radiative defect sites, and to prevent agglomeration or aggregation to overcome the Van der Waals binding force between the nanoparticles. In certain embodiments, the ligand can comprise a material having an affinity for any host material in which a quantum confined semiconductor nanoparticle may be included. As discussed herein, in certain embodiments, a shell comprises an inorganic shell.

The size and composition of the quantum confined semiconductor nanoparticles can be selected such that the nanoparticles emit photons at a predetermined wavelength.

For example, a predetermined arrangement can include quantum confined semiconductor nanoparticles that emit light at the same or different wavelengths.

In a monochromatic embodiment, the quantum confined semiconductor nanoparticles are selected to emit at a predetermined wavelength or wavelength band for the desired color upon absorption of excitation light.

In a multi-color or polychromatic embodiment, for example, the quantum confined semiconductor nanoparticles are selected to emit two or more different predetermined wavelengths for the desired light output when excited by optical energy from one or more light sources. The quantum confined semiconductor nanoparticles can further be arranged according to the wavelength or wavelength band of their emission in accordance with a predetermined arrangement.

The quantum confined semiconductor nanoparticles included in various aspects and embodiments of the inventions contemplated by this disclosure are preferably members of a population of quantum confined semiconductor nanoparticles having a narrow size distribution. More preferably, the quantum confined semiconductor nanoparticles comprise a monodisperse or substantially monodisperse population of quantum confined semiconductor nanoparticles.

The quantum confined semiconductor nanoparticles included in various aspects and embodiments of the inventions contemplated by this disclosure preferably have high emission quantum efficiencies such as greater than 30%, 40%, 50%, 60%, 70%, 80%, or 90%.

In certain embodiments, an optical component of the invention is useful, when optically coupled to a light source, for displaying one or more illuminated patterns that correspond to the one or more predetermined arrangements of quantum confined semiconductor nanoparticles included in the optical component.

In certain embodiments and aspects of the inventions contemplated by this disclosure, under ambient light conditions (e.g., when not optically excited by waveguided light from one or more light sources), the predetermined arrangement is not visibly emissive and is substantially transparent (<0.1 Abs units across the visible spectrum, or transmission>90% across the visible spectrum).

Quantum confined semiconductor nanoparticles included in certain embodiments of the inventions contemplated by this disclosure are useful, when optically coupled to a light source, for altering the wavelength of at least a portion of light emitted from the light source.

In these applications, quantum confined semiconductor nanoparticles are selected to have a bandgap smaller than the energy of at least a portion of the original light emitted from the light source. In certain embodiments, more than one light source can be optically coupled to an optical component.

In certain embodiments, an optical component includes a waveguide component including at least one feature, wherein the feature comprises a composition comprising a host material for the quantum confined semiconductor nanoparticles. Optionally, scatterers and/or other additives can also be included in the composition.

In certain embodiments, an optical component includes at least one layer including quantum confined semiconductor nanoparticles. In certain embodiments, the quantum confined semiconductor nanoparticles included in the layer are arranged in one or more predetermined arrangements. Examples of compositions for inclusion in a layer in which the quantum confined semiconductor nanoparticles may be included are described herein.

In certain embodiments, an optical component includes at least one such layer disposed directly or indirectly on a surface of the waveguide component.

In certain embodiments, an optical component includes at least one such layer disposed between the waveguide component and other optional layers that may be included on the waveguide component.

In certain embodiments, an optical component includes at least one such layer disposed between two separate waveguide components. (Other optional layers may also be included.)

In certain embodiments of an optical component includes a layer comprising a composition in accordance with the invention. In certain embodiments, at least one feature is disposed on a surface of the waveguide component.

In certain embodiments, at least one feature is embedded in the waveguide component.

In certain embodiments, one feature can have dimensions selected such that the feature covers all or a predetermined portion of a surface of the waveguide component.

In certain embodiments, a plurality of features is disposed on the waveguide component.

In certain embodiments, a plurality of features is embedded in the waveguide component.

In certain embodiments, the waveguide component includes one or more recesses, and at least one feature is included in one of the recesses.

In certain embodiments including a plurality of features, a portion of the features can be disposed on a surface of the waveguide component and a portion of the features can be embedded in the waveguide component. In certain embodiments, the features are arranged in a predetermined arrangement.

In certain embodiments including a plurality of features, each feature can comprise the same or different types of quantum confined semiconductor nanoparticles.

In certain embodiments including a plurality of features, the plurality of features can be arranged in a pattern. In certain of such embodiments, each feature can have a shape that is the same or similar to the shape of the other features. In certain of such embodiments, the shapes of all of the features need not be the same or similar.

In certain embodiments including a plurality of features, each feature can have size dimensions (e.g., length, width, and thickness) that are the same or similar to that of the other features. In certain embodiments, the size of all of the features need not be the same or similar.

In certain embodiments, a feature can have a thickness from about 0.1 to about 200 microns.

In certain embodiments, the features can be spatially dithered.

Dithering or spatial dithering is a term used, for example, in digital imaging to describe the use of small areas of a predetermined palette of colors to give the illusion of color depth. For example, white is often created from a mixture of small red, green and blue areas. In certain embodiments, using dithering of compositions including different types of quantum confined semiconductor nanoparticles (wherein each type is capable of emitting light of a different color) disposed on and/or embedded in a surface of a waveguide component can create the illusion of a different color. In certain embodiments, a waveguide component that appears to emit white light can be created from a dithered pattern of features including, for example, red, green and blue-emitting quantum confined semiconductor nanoparticles. Dithered color patterns are well known. In certain embodiments, the blue light component of the white light can comprise outcoupled unaltered blue excitation light and/or excitation light that has been down-converted by quantum confined semiconductor nanoparticles included in the waveguide component, wherein the nanoparticles comprise a composition and size preselected to down-convert the excitation light to blue.

In certain embodiments, white light can be obtained by layering compositions including different types of quantum confined semiconductor nanoparticles (based on composition and size) wherein each type is selected to obtain light having a predetermined color.

In certain embodiments, white light can be obtained by including different types of quantum confined semiconductor nanoparticles (based on composition and size) in a host material, wherein each type is selected to obtain light having a predetermined color.

In certain embodiments, a composition comprising a host material and quantum confined semiconductor nanocrystals is preferably hardened after it is applied to, or embedded in, a surface of a waveguide component. For example, in certain embodiments, the composition may be applied in a molten state which can harden upon cooling; it may be uv-, thermal-, chemically- or otherwise curable and cured after being applied to, or embedded in, a surface of a waveguide component, etc.

In certain embodiments, an optical component comprises a film including a carrier substrate including quantum confined semiconductor nanoparticles disposed over a surface thereof wherein the film is attached to a surface of a waveguide component. In certain embodiments, the film comprises a decal.

The descriptions herein relating to quantum confined semiconductor nanoparticles, compositions including quantum confined semiconductor nanoparticles, and the application thereof to a waveguide component (e.g., arrangements, thicknesses, multiple-colors, etc.) also apply to a carrier substrate and other aspects and embodiments of the inventions contemplated by this disclosure.

In certain embodiments, a carrier substrate can further include any one or more of the additional layers, structures, components, or other features described herein or otherwise contemplated by this disclosure as a further feature with a waveguide component in the various aspect and embodiments of an optical component in accordance with the invention.

In certain embodiments, quantum confined semiconductor nanoparticles are disposed over a predetermined region of a surface of the carrier substrate in a predetermined arrangement. In certain embodiments, the quantum confined semiconductor nanoparticles are included in a layer disposed over a predetermined region of a surface of the carrier substrate. In certain embodiments, the quantum confined semiconductor nanoparticles included in a layer are arranged in one or more predetermined arrangements.

In certain embodiments the carrier substrate can comprise a rigid material, e.g., glass, polycarbonate, acrylic, quartz, sapphire, or other known rigid materials with waveguide component characteristics.

In certain embodiments, the carrier substrate can comprise a flexible material, e.g., a polymeric material such as plastic or silicone (e.g. but not limited to thin acrylic, epoxy, polycarbonate, PEN, PET, PE).

Preferably, at least one, and more preferably two, of the major surfaces of the carrier substrate is smooth.

Preferably the carrier substrate is substantially optically transparent, and more preferably at least 99% optically transparent to the source light, per mm of waveguide pathlength.

In certain embodiments, the geometrical shape and dimensions of a carrier substrate can be selected based on the particular end-use application. In certain embodiments, the thickness of the carrier substrate is substantially uniform. In certain embodiments, the thickness of the carrier substrate is non-uniform (e.g., tapered).

Preferably, the carrier substrate comprises a thin flexible component. In certain embodiments, the thickness of the carrier substrate is less than or equal to about 1000 microns. In certain embodiments, the thickness of the carrier substrate is less than or equal to about 500 microns. In certain embodiments, the thickness of the carrier substrate is in a range from 10 to about 200 microns.

In certain embodiments, the film comprises a decal. In certain embodiments, a decal is fixedly attachable to a surface. Examples of techniques for fixedly attaching the decal to a surface include, without limitation, permanent adhesive, lamination, or other fixed attachment techniques. In certain embodiments, the decal can be removably attached to or repositioned on a surface. Examples of techniques for removably attaching the decal to a surface include use of a low-tack adhesive (e.g., 3M Post-it Note glue, etc.), use of a static cling-type material as the carrier substrate, or other removable attachment techniques. Preferably the technique or materials used to attach a decal to a surface are optically transparent or substantially optically transparent.

In certain embodiments, an underlying filter is disposed between the quantum confined semiconductor nanoparticles (whether or not included in a host material) and the waveguide component. In certain embodiments, an underlying filter covers all or at least a predetermined region of the waveguide component beneath one or more features. Preferably the underlying filter is capable of passing of one or more predetermined wavelengths of light, and can absorb or optionally reflect other wavelengths.

In certain embodiments, an overlying filter material is disposed over the surface of one or more of the features that is opposite the waveguide component. Preferably the overlying filter is capable passing one or more predetermined wavelengths of light, and can absorb or optionally reflect other wavelengths.

In certain embodiments, an optical component includes multiple filter layers on various surfaces of the waveguide component.

In certain embodiments, an optical component can further include one or more coupling members or structures that permit at least a portion of light emitted from a light source to be optically coupled from the light source into the waveguide component. Such members or structures include, for example, and without limitation, members or structures that are attached to a surface of the waveguide component, protrude from a surface of the waveguide component (e.g., prisms, gratings, etc.), are at least partially embedded in the waveguide component, or are positioned at least partially within a cavity in the waveguide component.

Figure 3:
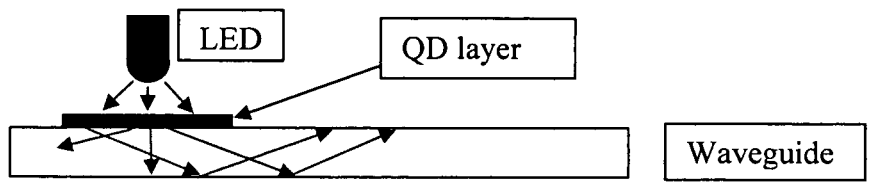
FIG. 3 is a schematic drawing depicting an example of an embodiment of the present invention.

In certain embodiments, a coupling member or structure can comprise quantum confined semiconductor nanoparticles. In such embodiments, quantum confined semiconductor nanoparticles can enhance coupling of light to the waveguide component. In these embodiments, coupling of light to the waveguide component can be especially enhanced when such nanoparticles are disposed on a surface, preferably a major surface, of the waveguide component. An example of such embodiment is schematically depicted in FIG. 3. In certain embodiments, such nanoparticles can be included in a composition in accordance with embodiments of the inventions described herein.

In certain embodiments of the inventions taught herein, for example, outcoupling members or structures may also be included. In certain embodiments, they can be distributed across a surface of the waveguide component or the top layer of the optical component or film. In certain preferred embodiments, such distribution is uniform or substantially uniform. In certain embodiments, coupling members or structures may vary in shape, size, and/or frequency in order to achieve a more uniform light distribution. In certain embodiments, coupling members or structures may be positive, i.e., sitting above the surface of the waveguide, or negative, i.e., depressed into the surface of the waveguide, or a combination of both. In certain embodiments, one or more features comprising a composition including a host material and quantum confined semiconductor nanoparticles can be applied to a surface of a positive coupling member or structure and/or within a negative coupling member or structure.

In certain embodiments, coupling members or structures can be formed by molding, embossing, lamination, applying a curable formulation (formed, for example, by techniques including, but not limited to, spraying, lithography, printing (screen, inkjet, flexography, etc), etc.)

In certain embodiments, quantum confined semiconductor nanoparticles are included in the waveguide component in an amount in the range from about 0.001 to about 15 weight percent based on the weight of the waveguide component. In certain preferred embodiments, the waveguide component includes from about 0.01 to about 10 weight percent quantum confined semiconductor nanoparticles based on the weight of the waveguide component. In certain more preferred embodiments, the waveguide component includes from about 0.01 to about 5 weight percent quantum confined semiconductor nanoparticles based on the weight of the waveguide component. In certain most preferred embodiments, the waveguide component includes from about 0.1 to about 2 weight percent quantum confined semiconductor nanoparticles based on the weight of the waveguide component. In certain embodiments, quantum confined semiconductor nanoparticles can be distributed within the waveguide component.

In certain embodiments, quantum confined semiconductor nanocrystals can be distributed in a predetermined region of the waveguide component. In certain embodiments, the distribution of quantum confined semiconductor nanoparticles can be substantially uniform throughout the predetermined region of the waveguide component. In certain embodiments, the concentration of quantum confined semiconductor nanoparticles throughout the predetermined region of the waveguide component can be non-uniform (e.g., graded).

In certain embodiments, quantum confined semiconductor nanocrystals can be distributed throughout the entire waveguide component. In certain embodiments, the distribution of quantum confined semiconductor nanoparticles can be substantially uniform throughout the entire waveguide component. In certain embodiments, the concentration of quantum confined semiconductor nanoparticles throughout the waveguide component can be non-uniform (e.g., graded).

In certain embodiments, scatterers are also distributed within the waveguide component. In certain embodiments, scatterers are included in an amount in the range from about 0.001 to about 15 weight percent of the weight of the waveguide component. In certain embodiments, additional additives can be included within the waveguide component (e.g., without limitation additional surfactants, defoaming agents).

In certain embodiments, the quantum confined semiconductor nanoparticles are included in a layer disposed over a surface of the waveguide component.

In certain embodiments, the layer has a thickness from about 0.1 to about 200 microns.

In certain embodiments, the layer further comprises a host material in which the quantum confined semiconductor nanoparticles are distributed.

In certain embodiments, quantum confined semiconductor nanoparticles are included in the layer in an amount in the range from about 0.001 to about 15 weight percent of the weight of the host material. In certain preferred embodiments, the layer includes from about 0.01 to about 10 weight percent quantum confined semiconductor nanoparticles based on the weight of the host material. In certain more preferred embodiments, the layer includes from about 0.01 to about 5 weight percent quantum confined semiconductor nanoparticles based on the weight of the host material. In certain most preferred embodiments, the layer includes from about 0.1 to about 2 weight percent quantum confined semiconductor nanoparticles based on the weight of the host material.

In certain embodiments, the host material can comprise a polymer, monomer, resin, binder, glass, metal oxide or other nonpolymeric material. Other examples of host materials are described herein. In certain embodiments, the quantum confined semiconductor nanoparticles are uniformly dispersed in the layer. In certain embodiments, the quantum confined semiconductor nanoparticles are non-uniformly dispersed in the layer.

In certain embodiments, scatterers are also included in the layer. In certain embodiments, scatterers are included in the layer in an amount in the range from about 0.001 to about 15 weight percent of the weight of the host material.

In certain embodiments, the quantum confined semiconductor nanoparticles are contained or dispersed within a host material particle, vesicle, microcapsule or the like. Such microcapsules can also be prepared using a technique such as that described in "Preparation of lipophilic dye-loaded poly (vinyl alcohol) microcapsules and their characteristics, by Budriene et al, 2002. In certain embodiments, the nanoparticles may be included in particles such as those described in U.S. Application No. 61/033,729, filed 4 Mar. 2008, of John R. Linton for "Particles Including Nanoparticles, Uses Thereof, and Methods", which is hereby incorporated herein be reference in its entirety. Other techniques readily ascertainable by one of ordinary skill in the relevant can be used. An example of a preferred encapsulant system includes PVA and a squalane solvent. Microencapsulation may be a preferred approach to dispersing the semiconductor nanoparticles within the host material in order to improve the packaging (gas permeability properties) or material properties (index of refraction, scattering, etc). Microencapsulation may also be preferred if handling individual nanoparticles is not desired, for example, during processing. These host material particles, vesicles, microcapsules or the like can have various shapes from spherical to irregular, and can range in size from 100 nm to 100 µm in diameter. These particles can then be distributed uniformly or non-uniformly throughout the host material.

Optionally other additives (including, but not limited to, UV absorbers, etc.) can be included in the layer.

In certain embodiments, a plurality of layers comprising quantum confined semiconductor nanoparticles is disposed over a surface of the waveguide component. In certain embodiments, additional additives can be included within the waveguide component (e.g., without limitation additional surfactants, defoaming agents, scatterers).

In certain embodiments, the waveguide component includes a layer comprising quantum confined semiconductor nanoparticles disposed as a patterned layer over a predetermined region of a surface of the waveguide component. In certain preferred embodiments, the layer comprising quantum confined semiconductor nanoparticles are arranged in predetermined pattern wherein the quantum confined semiconductor nanoparticles are selected and tuned to emit photons of one or more predetermined wavelengths in response to absorption of light.

In certain embodiments, the waveguide component includes a layer comprising quantum confined semiconductor nanoparticles disposed as an unpatterned layer over a predetermined region of a surface of the waveguide component.

In certain embodiments, a film or layer comprising quantum confined semiconductor nanoparticles can be prepared separately from the waveguide component. It can then be adhered or laminated to the surface of the waveguide. The film or layer containing the quantum confined semiconductor nanoparticles can then be cut into a predetermined shape. In certain embodiments, the layer shape can be achieved by die-cutting. Such film or layer may further include a filter above and/or below, as part of the film or layer or as another part of the waveguide or optical component.

In certain embodiments and aspects of the inventions contemplated by this disclosure, the quantum confined semiconductor nanoparticles have an average particle size in a range from about 1 to about 100 nanometers (nm). In certain embodiments, the quantum confined nanoparticles have an average particle size in a range from about 1 to about 20 nm. In certain embodiments, the quantum confined semiconductor nanoparticles have an average particle size in a range from about 2 to about 10 nm.

Preferably, ligands are attached to a surface of at least a portion of the quantum confined semiconductor nanoparticles.

In certain embodiments and aspects of the inventions contemplated by this disclosure including quantum confined semiconductor nanoparticles, at least a portion of the quantum confined semiconductor nanoparticles are capable of converting the wavelength of at least a portion of light coupled into the waveguide component from a light source to one or more predetermined wavelengths.

In certain embodiments and aspects of the inventions contemplated by this disclosure including quantum confined semiconductor nanoparticles, the quantum confined semiconductor nanoparticles comprise semiconductor nanocrystals. In certain embodiments the quantum confined semiconductor nanoparticles comprise semiconductor nanocrystals including a core/shell structure. In certain preferred embodiments and aspects of the inventions contemplated by this disclosure including a waveguide component, the waveguide component is transparent to light coupled to the waveguide component from a light source and to light emitted by the quantum confined semiconductor nanoparticles.

In certain embodiments and aspects of the inventions contemplated by this disclosure including a waveguide component, the waveguide component can comprise a rigid material, e.g., glass, polycarbonate, acrylic, quartz, sapphire, or other known rigid materials with waveguide component characteristics.

In certain embodiments and aspects of the inventions contemplated by this disclosure that include a waveguide component, the waveguide components can alternatively comprise a flexible material, e.g., a polymeric material such as plastic or silicone (e.g. but not limited to thin acrylic, epoxy, polycarbonate, PEN, PET, PE).

In certain embodiments and aspects of the inventions contemplated by this disclosure that include a waveguide component, the waveguide component is planar.

In certain embodiments and aspects of the inventions contemplated by this disclosure that include a waveguide components, at least the texture of the surface of the waveguide component from which light is emitted is selected to enhance or otherwise alter the pattern, angle, or other feature of light transmitted therethrough. For example, in certain embodiments, the surface may be smooth; in certain embodiments, the surface may be non-smooth (e.g., the surface is roughened or the surface includes one or more raised and/or depressed features); in certain embodiments, the surface may include both smooth and non-smooth regions.

In certain embodiments and aspects of the inventions contemplated by this disclosure, the geometrical shape and dimensions of a waveguide component and/or an optical component can be selected based on the particular end-use application. In certain embodiments, the thickness of the waveguide component can be substantially uniform. In certain embodiments, the thickness of the waveguide can be non-uniform (e.g., tapered).

In certain embodiments and aspects of the inventions contemplated by this disclosure, at least 0.1% of the light coupled from the light source to the waveguide component is absorbed and reemitted by the quantum confined semiconductor nanoparticles. In certain embodiments, at least 10% of the light coupled from the light source to the waveguide component is absorbed and reemitted by the quantum confined semiconductor nanoparticles. In certain embodiments, at least 20% of the light coupled from the light source to the waveguide component is absorbed and reemitted by the quantum confined semiconductor nanoparticles. In certain embodiments, at least 30% of the light coupled from the light source to the waveguide component is absorbed and reemitted by the quantum confined semiconductor nanoparticles. In certain embodiments, at least 40% of the light coupled from the light source to the waveguide component is absorbed and reemitted by the quantum confined semiconductor nanoparticles. In certain embodiments, at least 50% of the light coupled from the light source to the waveguide component is absorbed and reemitted by the quantum confined semiconductor nanoparticles. In certain embodiments, at least 60% of the light coupled from the light source to the waveguide component is absorbed and reemitted by the quantum confined semiconductor nanoparticles. In certain embodiments, at least 70% of the light coupled from the light source to the waveguide component is absorbed and reemitted by the quantum confined semiconductor nanoparticles. In certain embodiments, at least 80% of the light coupled from the light source to the waveguide component is absorbed and reemitted by the quantum confined semiconductor nanoparticles. In certain embodiments, at least 90% of the light coupled from the light source to the waveguide component is absorbed and reemitted by the quantum confined semiconductor nanoparticles.

In certain embodiments and aspects of the inventions contemplated by this disclosure, an optical component comprises a thin flexible component. In certain embodiments, the thickness of the optical component is less than or equal to about 1000 microns. In certain embodiments, the thickness of the component is less than or equal to about 500 microns. In certain embodiments, the thickness of the component is in a range from 10 to about 200 microns.

In certain embodiments, an optical component further includes a coupling means for coupling light from a light source through an edge of the waveguide component. Examples of light sources include, but are not limited to, those listed below. In certain embodiments, more than one coupling means can be included for coupling more than one light source to the waveguide component.

In accordance with another aspect of the invention, there is provided a system comprising an optical component in accordance with the invention and a light source optically coupled to the waveguide component. In certain embodiments, the waveguide component includes from about 0.001 to about 15 weight percent quantum confined semiconductor nanoparticles based on the weight of the waveguide component. In certain embodiments, the waveguide component includes from about 0.01 to about 10 weight percent quantum confined semiconductor nanoparticles based on the weight of the waveguide component. In certain embodiments, the waveguide component includes from about 0.01 to about 5 weight percent quantum confined semiconductor nanoparticles based on the weight of the waveguide component. In certain embodiments, the waveguide component includes from about 0.1 to about 2 weight percent quantum confined semiconductor nanoparticles based on the weight of the waveguide component. In certain embodiments, the quantum confined semiconductor nanoparticles are included in a host material. In certain embodiments, the quantum confined semiconductor nanoparticles are included in a composition in accordance with the invention. In certain embodiments, the quantum confined semiconductor nanoparticles are included in one or more predetermined arrangements over a predetermined region of a surface of the waveguide component that is intended as the viewing surface.

Examples of light sources include, without limitation, solid state light emitting devices (e.g., an electroluminescent device or a thin film electroluminescent device TFEL (which are well know and available from numerous sources, including, for example, but not limited to, Durel, and Luminus Films http://www.luminousfilm.com/el_lamp.htm), an LED (e.g., an inorganic LED, such as an inorganic semiconductor LEDs, which are well known in the art and are available from numerous sources), a solid state laser, or other known solid state lighting device), a gas discharge lamp (e.g., a fluorescent lamp CCFL, a sodium vapor lamp, a metal halide lamp, a high pressure mercury lamp, a CRT), other laser devices. The above light sources are well know and available from numerous sources. A light source can emit in a visible or invisible (e.g., infrared, ultraviolet, etc.) region of the electromagnetic spectrum.

In certain embodiments, a system can include a single light source.

In certain embodiments, a system can include a plurality of light sources.

In certain embodiments including a plurality of light sources, the individual light sources can be the same or different.

In certain embodiments including a plurality of light sources, each individual light sources can emit light having a wavelength that is the same as or different from that emitted by each of the other light sources.

In certain embodiments including a plurality of light sources, the individual light sources can be arranged as an array.

In certain embodiments including a plurality of light sources, the individual light sources can optically coupled to introduce light into the same or different areas of the waveguide component.

In certain embodiments, a light source comprises a blue LEDs (e.g., (In)GaN blue) or a UV LEDs.

In certain embodiments, a light source or light source array is optically coupled to an edge of the waveguide component.

In one embodiment, a system can include two or more optical components of the invention. Such optical components are preferably arranged such that the waveguide component (preferably constructed from glass or other optically transparent material) of each is parallel to that of each other optical component, and each optical component is coupled to a separate light source. The optical components preferably are separated from each such that there is no "optical communication" between the optical components. Such separation can be achieved by an air gap due to physical spacing between the components or by a layer of lower refractive index. The two or more optical components can be mounted in a single base or frame or in multiple bases or frames. Each waveguide can include one or more predetermined arrangements of quantum confined semiconductor nanoparticles having predetermined emissive characteristics. The arrangement(s) of quantum confined semiconductor nanoparticles included in or on each optical component can be the same or different from that on another of the optical components. The light sources can be programmed or otherwise adapted to be lighted at the same time or on a time sequenced basis. For example, in a signage application, each optical component included in the system can have a different image (e.g., logo, text, drawing, picture, various combinations of the foregoing, or other predetermined arrangement.) Preferably the quantity and thickness of quantum confined semiconductor nanoparticles included in the arrangement thereof on one or all of the optical components are selected such that when the light source optically coupled thereto is not operational, the arrangement is substantially transparent to the viewer. In certain embodiments including two or more optical components, the optical components may be positioned to have different orientations. For example, one may be positioned for intended viewing in a first orientation, and another is positioned for intended viewing at a second orientation, e.g., at a 90 degree rotation from the first.

In certain signage embodiments, the waveguide component can comprise a window or other structural, decorative, architectural, or other structure or element fabricated from a material with waveguiding capability to which a predetermined arrangement including quantum confined semiconductor nanoparticles are applied as contemplated by this disclosure in accordance with this disclosure and into which light is coupled from a light source, as also contemplated herein. As is particularly advantageous for certain applications, when not optically excited by the waveguided light from one or more light sources, the predetermined arrangement is not visibly emissive and is substantially transparent under ambient conditions (<0.1 Abs units).

In accordance with another aspect of the invention, there is provided a kit comprising a light source adapted for being optically coupled to a waveguide component and one or more films, wherein at least one film comprises a carrier substrate including quantum confined semiconductor nanoparticles disposed over a surface thereof. In certain embodiments, the quantum confined semiconductor nanoparticles are disposed in a predetermined arrangement. In certain embodiments, the film includes from about 0.001 to about 15 weight percent quantum confined semiconductor nanoparticles based on the weight of the film. In certain embodiments, one or more of the films comprises a decal. In certain embodiments, the kit further includes a waveguide component.

In certain embodiments, the geometrical shape and dimensions of a carrier substrate of the decal or other film can be selected based on the particular end-use application. In certain embodiments, the thickness of the carrier substrate is substantially uniform. In certain embodiments, the thickness of the carrier substrate can be non-uniform (e.g., tapered).

Preferably, the carrier substrate comprises a thin flexible component. In certain embodiments, the thickness of the carrier substrate is less than or equal to about 1000 microns. In certain embodiments, the thickness of the carrier substrate is less than or equal to about 500 microns. In certain embodiments, the thickness of the carrier substrate is in a range from 10 to about 200 microns.

In certain embodiments, the light source(s) are adapted for coupling light into a waveguide component. For example, one or more light sources (e.g., one or more lamps, LEDs, or other lighting devices) can by included in a structural member which is adapted for fixed or removable attachment to a surface of the waveguide component for coupling light into the waveguide component. In certain embodiments, the structural member positions the one or more light sources included therein such that such that substantially none of the light coupled into the waveguide component passes directly out of the surface of the waveguide component over which the quantum confined semiconductor nanoparticles are disposed. In such embodiments, light emitted from the surface is that absorbed and re-emitted by the nanoparticles. In certain embodiments in which the light is coupled into the surface of the waveguide component over which the nanoparticles are disposed, the angle at which the light is directed into such surface of the waveguide component is no greater than the critical angle for the member (e.g., 42 degrees for glass/air). In certain embodiments, the structural member comprises a prism with a triangular cross-section, preferably a 30-60-90 triangle, which is optically coupled to the waveguide component.

Figure 5:
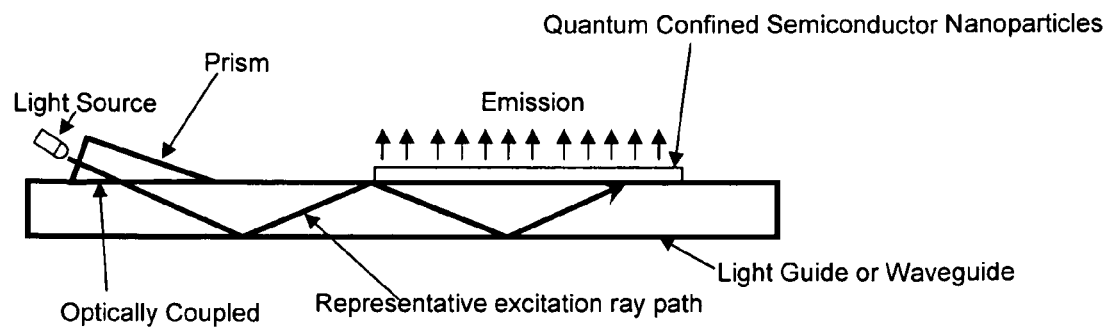
FIG. 5 is a schematic drawing depicting an example of an embodiment of the present invention.

FIG. 5 schematically depicts an example of various embodiments of the present invention. A light guide or waveguide (which can be a waveguide component or a member having waveguiding capability) includes quantum confined semiconductor nanoparticles disposed over a surface thereof. In certain embodiments, the nanoparticles can be included in a composition taught herein. In certain embodiments, the nanoparticles can be included on a film as taught herein which is attached to the light guide. In the illustrated example, a light source is positioned to couple light into the surface of the light guide over which the nanoparticles are disposed. In the depicted example, where access to the edge of the light guide may not be accessible, in order to avoid light passing directly through the light guide, a structural member comprising a prism is used as a means to position the light source at an angle not exceeding the critical angle for being coupled into the light guide.

In certain embodiments, the nanoparticles or film can be disposed on the surface of the light guide. In certain embodiments, other layers or structures can be position between them.

In certain embodiments, a kit can include other light sources, films, quantum confined semiconductor nanoparticles, waveguide components, compositions, etc. described herein.

In accordance with another aspect of the invention, there is provided a method for making a sign comprising applying a film in accordance with the invention to a surface of a member, coupling light into the member such that the light optically excites the quantum confined semiconductor nanoparticles included directly or indirectly on the carrier substrate. In certain embodiments, a member comprises a window (building, vehicle of any kind) or other structural, decorative, architectural, or other structure or element fabricated from a material with waveguiding capability. In certain embodiments, the film comprises a decal.

In certain embodiments, the method comprises applying a film in accordance with the invention to a surface of an optically transparent material having light waveguiding capability, coupling light into a surface or edge of the member such that the light is waveguided within the member and optically excites the quantum confined semiconductor nanoparticles included directly or indirectly on the carrier substrate. In certain embodiments, the member comprises a window (building, vehicle of any kind), or other structural, decorative, architectural, or other article or element fabricated from an optically transparent or substantially optically transparent material with waveguiding capability. The predetermined arrangement on the film can comprise a patterned or unpatterned arrangement. In certain embodiments, the film comprises a decal.

In accordance with another aspect of the present invention, there is provided a TFEL lamp including quantum confined semiconductor nanoparticles disposed on a surface of the lamp. In certain embodiments, quantum confined semiconductor nanoparticles are disposed in a predetermined arrangement. In certain embodiments, the quantum confined semiconductor nanoparticles are included in a layer disposed over a surface of the lamp. In certain embodiments, the layer covers the entire light emitting surface of the lamp.

In certain embodiments, the quantum confined semiconductor nanoparticles included in a layer are arranged in one or more predetermined arrangements. In certain embodiments, the layer further comprises a host material in which the quantum confined semiconductor nanoparticles are distributed.

In certain embodiments, the quantum confined semiconductor nanoparticles are included in the host material in an amount in the range from about 0.001 to about 15 weight percent of the weight of the host material. Preferably the host material comprises a solid (as opposed to a liquid) material.

In certain embodiments, scatters are further included in the host material.

In certain embodiments, a TFEL lamp includes a film in accordance with the invention. In certain embodiments, the film comprises a decal that is attached to a surface of the lamp. In certain embodiments, the decal is laminated to the lamp structure. In certain embodiments, the decal is included in the lamp structure before the lamp is packaged or encapsulated. In certain embodiments, one or more filter layers are included under and/or over the quantum confined semiconductor nanoparticles. Other layers and/or features can also be included over the lamp and/or in the film. In certain embodiments, the film comprises a decal. In certain embodiments, an underlying filter is disposed between the quantum confined semiconductor nanoparticles (whether or not included in a host material) and the surface of the TFEL lamp. In certain embodiments, an underlying filter covers all or at least a predetermined region of the TFEL lamp beneath one or more features. Preferably the underlying filter is capable of passing of one or more predetermined wavelengths of light, and can absorb or optionally reflect other wavelengths In certain embodiments, an overlying filter material is disposed over the surface of one or more of the features that is opposite the TFEL lamp. Preferably the overlying filter is capable passing one or more predetermined wavelengths of light, and can absorb or optionally reflect other wavelengths.

In certain embodiments, multiple filter layers are included.

In certain embodiments, a TFEL lamp can further include one or more coupling members or structures that permit at least a portion of light emitted from the lamp to be optically coupled from the lamp into the nanoparticles. Such members or structures include, for example, and without limitation, members or structures that are attached to a surface of the TFEL lamp, protrude from a surface of the TFEL lamp (e.g., prisms), are at least partially embedded in the surface of the lamp over which the nanoparticles are disposed. In certain embodiments, for example, coupling members or structures may be distributed across a surface of the lamp. In certain preferred embodiments, such distribution is uniform or substantially uniform. In certain embodiments, coupling members or structures may vary in shape, size, and/or frequency in order to achieve a more uniform light distribution outcoupled from the surface. In certain embodiments, coupling members or structures may be positive, i.e., sitting above the surface of the lamp, or negative, i.e., depressed into the surface of the lamp, or a combination of both. In certain embodiments, one or more features comprising a composition including a host material and quantum confined semiconductor nanoparticles can be applied to a surface of a positive coupling member or structure and/or within a negative coupling member or structure.

Figure 6:
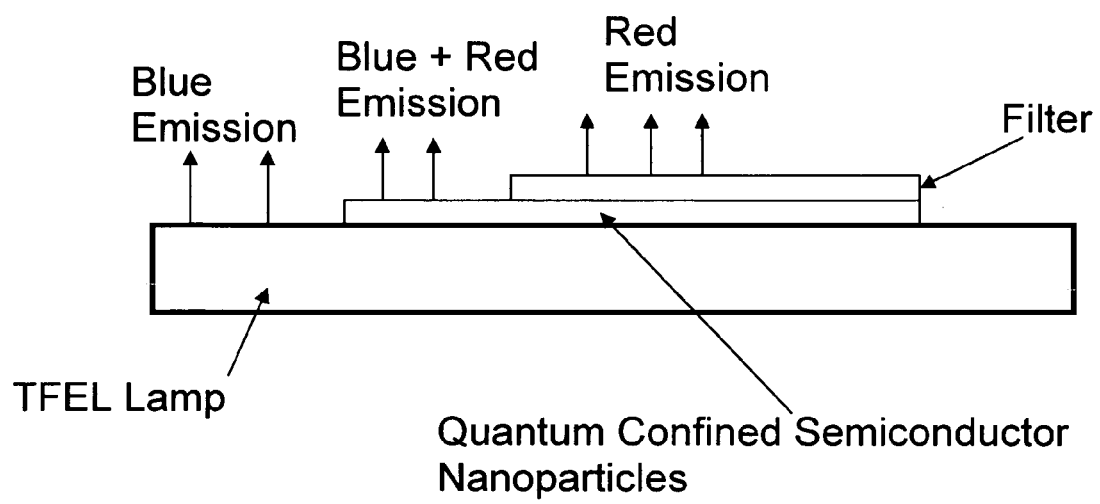
FIG. 6 is a schematic drawing depicting an example of an embodiment of a TFEL lamp in accordance with the invention.

FIG. 6 schematically depicts an example of various embodiments of a TFEL lamp in accordance with the present invention. A TFEL lamp is shown which includes quantum confined semiconductor nanoparticles disposed over a surface thereof. In certain embodiments, the nanoparticles can be included in a composition taught herein. In certain embodiments, the nanoparticles can be included on a film as taught herein which is attached to a surface of the lamp. In the illustrated example, an overlying filter is disposed over a portion of the layer of nanoparticles. In the figure, the uncoated portion of the lamp is shown to generate blue light emission; the lamp light that passes through the portion of the nanoparticle layer that is not covered by the overlying filter includes red and blue light emission; and lamp light that passes through the portion of the nanoparticle layer that is covered by the overlying filter includes red light emission. Different color light output can be achieved with different filter selection and nanoparticle size and composition.

In accordance with still further aspects of the invention, various applications and devices that include an optical component and/or system in accordance with the invention are provided. Examples include, without limitation, user-interface illumination, solid state lighting devices, and displays. A number of examples of user-interface illumination are described in U.S. Pat. No. 6,422,712, the disclosure of which is hereby incorporated herein by reference in its entirety.

Quantum confined semiconductor nanoparticles possess characteristics and properties that make them particularly well-suited for use in a variety of devices and end-use applications, including, but not limited to, light emitting devices, solid state lighting, displays, photodetectors, other lighting components, nonvolatile memory devices, solar cells, sensors, photovoltaic devices, etc.

Certain aspects and embodiments of the inventions taught herein may be advantageous for inclusion in solid state lighting devices, including, but not limited to, those disclosed in U.S. Application Ser. No. 60/950,598, filed 18 Jul. 2007, of Peter T. Kazlas for "Quantum Dot-Based Light Sheets Useful For Solid State Lighting", which is hereby incorporated herein by reference in its entirety. Certain aspects and embodiments of the inventions taught herein may be advantageous for inclusion in photovoltaic devices, including, but not limited to, those disclosed in U.S. Application Ser. No. 60/946,382, filed 26 Jun. 2007, of Seth Coe-Sullivan et al., for "Solar Cells Including Quantum Dot Down-Conversion Materials for Photovoltaics And Materials Including Quantum Dots", which is hereby incorporated herein by reference in its entirety. Certain aspects and embodiments of the inventions taught herein may be advantageous for inclusion in other types of electronic or opto-electronic devices.

In certain embodiments, a display includes an optical component in accordance with the invention and a light source coupled to the optical component. Examples of a light source include, but are not limited to, an EL lamp, a TFEL lamp, an LED, a fluorescent lamp, a high pressure discharge lamp, a tungsten halogen lamp, a laser, and arrays of any of the foregoing. In certain embodiments, the optical component is back-illuminated (back-lit), front illuminated (front-lit), edge-illuminated (edge-lit), or with other configurations wherein light from a light source is directed through the optical component for creating display images or indicia.

In certain aspects and embodiments of the inventions contemplated by this disclosure, quantum confined semiconductor nanoparticles comprise semiconductor nanocrystals wherein at least a portion of the semiconductor nanocrystals include one or more ligands attached to a surface thereof.

In certain aspects and embodiments of the inventions contemplated by this disclosure, a composition in accordance with an embodiment of the invention can further include a UV absorber, a dispersant, leveling agent, viscosity modifiers, colorants (e.g., dyes), phosphor particles, humectants, fillers, extenders, etc., and mixtures thereof.

In certain aspects and embodiments of the inventions contemplated by this disclosure, a composition in accordance with an embodiment of the invention does not include phosphor particles.

In certain preferred embodiments, a composition in accordance with the invention can be prepared, for example, from an ink comprising quantum confined semiconductor nanoparticles and a liquid vehicle, wherein the liquid vehicle comprises one or more functional groups that are capable of being polymerized (e.g., cross-linked) to form a host material. In certain embodiments, the functional units can be cross-linked by UV treatment. In certain embodiments, the functional units can be cross-linked by thermal treatment. In certain embodiments, the functional units can be cross-linked by other cross-linking technique readily ascertainable by a person of ordinary skill in a relevant art. In certain embodiments, the composition including one or more functional groups that are capable of being cross-linked can be the liquid vehicle itself. In certain embodiments the host is solidified from the liquid vehicle by solvent removal from a resin in solution.

See also U.S. Application No. 60/946,090 of Linton, et al., for "Methods For Depositing Nanomaterial, Methods For Fabricating A Device, Methods For Fabricating An Array Of Devices And Compositions", filed 25 Jun. 2007, and U.S. Application No. 60/949,306 of Linton, et al., for "Compositions, Methods For Depositing Nanomaterial, Methods For Fabricating A Device, And Methods For Fabricating An Array Of Devices", filed 12 Jul. 2007, the disclosures of each of which are hereby incorporated herein by reference. Optionally, the ink further includes scatterers and/or other additives.

In certain embodiments, an optical component can be a top or bottom surface, or other component of a light emitting device, a display, another type of lighting device or unit, a waveguide, and the like.

In certain embodiments, a film, waveguide component, or optical component may optionally include one or more additional layers and/or elements. In one embodiment, for example, an optical component may further include one or more separate layers including scatterers. A layer including scatterers may be disposed over and/or under any layer or other arrangement of quantum confined semiconductor nanoparticles included directly or indirectly on a film or waveguide component or in an optical component (whether or not the layer or other arrangement of quantum confined semiconductor nanoparticles further includes scatters and/or other additives or materials). In certain embodiments of a film, waveguide, or optical component including two or more stacked layers or other arrangements including quantum confined semiconductor nanoparticles, one or more layers comprising scatterers may be disposed between any or all of the layers including nanoparticles. Examples of scatters are provided elsewhere herein. In certain embodiments, layers including scatterers can be patterned or unpatterned. In various embodiments and aspects of the inventions contemplated by this disclosure, quantum confined semiconductor nanoparticles comprise semiconductor nanocrystals. Semiconductor nanocrystals possess characteristics and properties that make them particularly well-suited for use in a variety of devices and other end-use applications, including, but not limited to, light emitting devices, displays, photodetectors, nonvolatile memory devices, solar cells, sensors, photovoltaic devices, etc.

In certain aspects and embodiments of the inventions contemplated by this disclosure, reflective components such as reflective films, aluminized coatings, surface relief features, brightness enhancing films, and other components that can re-direct or reflect light can be further included. A waveguide component or film may also contain non-scattering regions such as substrates.

Examples of optical coupling methods include, but are not limited to, methods of coupling wherein the two regions coupled together have similar refractive indices or using an optical adhesive with a refractive index substantially near or in-between the regions or layers. Optical coupling can also be accomplished by an air gap between the light source and waveguide component. Other non-limiting examples of optical coupling include lamination using an index-matched optical adhesive, coating a region or layer onto another region or layer, or hot lamination using applied pressure to join two or more layers or regions that have substantially close refractive indices. Thermal transferring is another method that can be used to optically couple two regions of material.

Figure 2:
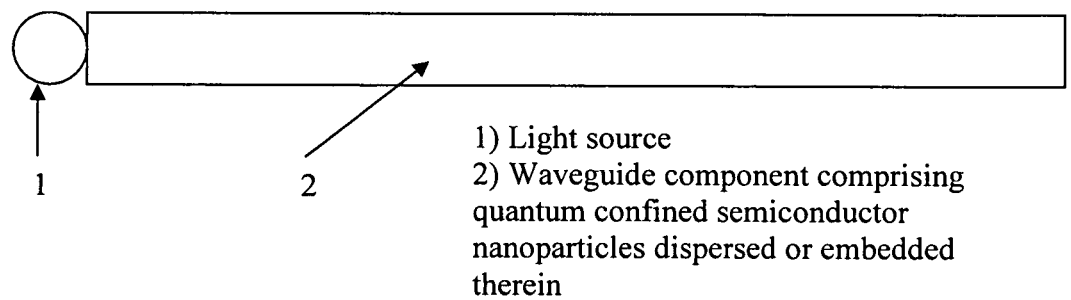
FIG. 2 is a schematic drawing depicting an example of an embodiment of a system including an optical component in accordance with the invention.

FIG. 1 and FIG. 2 provide schematic drawings of examples of certain embodiments of a system including an optical component in accordance with the present invention and a light source.

In the example shown, the optical component includes a waveguide component 1 and a layer comprising semiconductor nanocrystals disposed on a major surface of the waveguide component. In certain embodiments, the layer comprising quantum confined semiconductor nanoparticles (preferably, semiconductor nanocrystals) can optionally further include a host material in which the quantum confined semiconductor nanoparticles are dispersed. Such dispersion can be uniform or non-uniform. In the depicted example, the light source is optically coupled to the waveguide component by being butted against an edge of the waveguide component. Other methods of coupling the light source to the waveguide component include embedding the light source within the waveguide component, or coupling the light source to the face of the waveguide through features, gratings, or prisms.

Because semiconductor nanocrystals have narrow emission linewidths, are photoluminescent efficient, and emission wavelength tunable with the size and/or composition of the nanocrystals, they are preferred for use in the various aspects and embodiments of the inventions contemplated by this disclosure.

Because the size of the semiconductor nanocrystals preferably ranges from 1.2 nm to 15 nm, coatings containing the semiconductor nanocrystals and not containing scattering particles can be substantially transparent. Coatings containing other down-converting particles such as phosphors, which have particle sizes from 1 micron to 50 microns are hazy to opaque (depending on particle concentration).

The size and composition of quantum confined semiconductor nanoparticles (including, e.g., semiconductor nanocrystals) can be selected such that semiconductor nanocrystals emit photons at a predetermined wavelength or wavelength band in the far-visible, visible, infra-red or other desired portion of the spectrum. For example, the wavelength can be between 300 and 2,500 nm or greater, such as between 300 and 400 nm, between 400 and 700 nm, between 700 and 1100 nm, between 1100 and 2500 nm, or greater than 2500 nm.

Quantum confined semiconductor nanoparticles can be dispersed in a liquid medium and are therefore compatible with thin-film deposition techniques such as spin-casting, drop-casting, phase-separation, and dip coating. Quantum confined semiconductor nanoparticles can alternatively be deposited by ink-jet printing, silk-screening, and other liquid film techniques available for forming patterns on a surface.

An ink including quantum confined semiconductor nanoparticles dispersed in a liquid medium can also be deposited onto a surface of a waveguide or other substrate or surface by printing, screen-printing, spin-coating, gravure techniques, inkjet printing, roll printing, etc. The ink can be deposited in a predetermined arrangement. For example, the ink can be deposited in a patterned or unpatterned arrangement. For additional information that may be useful to deposit an ink onto a substrate, see for example, International Patent Application No. PCT/US2007/014711, entitled "Methods For Depositing Nanomaterial, Methods For Fabricating A Device, And Methods For Fabricating An Array Of Devices", of Seth A. Coe-Sullivan, filed 25 Jun. 2007, International Patent Application No. PCT/US2007/014705, entitled "Methods For Depositing Nanomaterial, Methods For Fabricating A Device, Methods For Fabricating An Array Of Devices And Compositions", of Seth A. Coe-Sullivan, et al., filed 25 Jun. 2007, International Patent Application No. PCT/US2007/014706, entitled "Methods And Articles Including Nanomaterial", of Seth A. Coe-Sullivan, et al., filed 25 Jun. 2007, International Patent Application No. PCT/US2007/08873, entitled "Composition Including Material, Methods Of Depositing Material, Articles Including Same And Systems For Depositing Material", of Seth A. Coe-Sullivan, et al., filed 9 Apr. 2007, International Patent Application No. PCT/US2007/09255, entitled "Methods Of Depositing Material, Methods Of Making A Device, And Systems And Articles For Use In Depositing Material", of Maria J, Anc, et al., filed 13 Apr. 2007, International Patent Application No. PCT/US2007/08705, entitled "Methods And Articles Including Nanomaterial", of Seth Coe-Sullivan, et al, filed 9 Apr. 2007, International Patent Application No. PCT/US2007/08721, entitled "Methods Of Depositing Nanomaterial & Methods Of Making A Device" of Marshall Cox, et al., filed 9 Apr. 2007, U.S. patent application Ser. No. 11/253,612, entitled "Method And System For Transferring A Patterned Material" of Seth Coe-Sullivan, et al., filed 20 Oct. 2005, and U.S. patent application Ser. No. 11/253,595, entitled "Light Emitting Device Including Semiconductor Nanocrystals", of Seth Coe-Sullivan, et al., filed 20 Oct. 2005, each of the foregoing patent applications being hereby incorporated herein by reference.

For additional information relating to contact printing, see, for example, A. Kumar and G. Whitesides, *Applied Physics Letters*, 63, 2002-2004, (1993); and V. Santhanam and R. P. Andres, *Nano Letters*, 4, 41-44, (2004), each of which is incorporated by reference in its entirety.

Ink-based deposition techniques can be used for depositing a various thicknesses of quantum confined semiconductor nanoparticles. In certain embodiments the thickness is selected to achieve the desired % absorption thereby. Examples of desired % absorptions can include, without limitation, from about 0.1% to about 99%, from about 10% to about 90%, from about 10% to about 50%, from about 50% to about 90%. Preferably, the quantum confined semiconductor nanoparticles absorb at least a portion of impinging light and reemit at least a portion of the absorbed light energy as one or more photons of a predetermined wavelength(s). Most preferably, the quantum confined semiconductor nanoparticles do not absorb any, or absorb only negligible amounts of, the re-emitted photons.

In certain embodiments, a composition including quantum confined semiconductor nanoparticles is applied a predefined region (also referred to herein as a predetermined region) on a waveguide or other substrate. The predefined region is a region on the substrate where the composition is selectively applied. The composition and substrate can be chosen such that the material remains substantially entirely within the predetermined region. By selecting a predefined region that forms a pattern, composition can be applied to the substrate such that the material forms a pattern. The pattern can be a regular pattern (such as an array, or a series of lines), or an irregular pattern. Once a pattern of composition is formed on the substrate, the substrate can have a region including the material (the predefined region) and a region substantially free of the composition. In some circumstances, the composition forms a monolayer thickness of nanoparticles on the substrate. The predefined region can be a discontinuous region. In other words, when the composition is applied to the predefined region of the substrate, locations including the composition can be separated by other locations that are substantially free of the composition.

Due to the positioning of the quantum confined semiconductor nanoparticles in features or layers resulting from these deposition techniques, not all of the surfaces of the nanoparticles may be available to absorb and emit light.

Alternatively, quantum confined semiconductor nanoparticles can be dispersed in a light-transmissive material (e.g., a polymer, a resin, a silica glass, or a silica gel, etc., which is preferably at least partially light-transmissive, and more preferably transparent, to the light emitted by the quantum confined semiconductor nanoparticles and in which quantum confined semiconductor nanoparticles can be dispersed) that is deposited as a full or partial layer or in a patterned arrangement by any of the above-listed or other known techniques. Suitable materials include many inexpensive and commonly available materials, such as polystyrene, epoxy, polyimides, and silica glass.

In certain embodiments, such material may contain a dispersion of quantum confined semiconductor nanoparticles where the nanoparticles have been size selected so as to produce light of a given color under optical excitation. Other configurations of quantum confined semiconductor nanoparticles disposed in a material, such as, for example, a two-dimensional layer on a substrate with a polymer overcoating are also contemplated.

In certain embodiments in which quantum confined semiconductor nanoparticles are dispersed in a host material and applied as a layer on a surface of the waveguide component, the refractive index of the layer including the quantum confined semiconductor nanoparticles can have a refractive index that is greater than or equal to the refractive index of the waveguide component.

In certain embodiments in which the quantum confined semiconductor nanoparticles are dispersed in a host material and applied as a layer on a surface of the waveguide component, the refractive index of the layer including the quantum confined semiconductor nanoparticles can have a refractive index that is less than the refractive index of the waveguide component.

In certain embodiments, a reflective material can be applied to the edges of the waveguide component to enhance internal reflections of light within the waveguide component.

In certain embodiments, a reflective material can be applied to a surface of the waveguide component opposite that on which a layer including quantum confined semiconductor nanoparticles is disposed to enhance internal reflections of light within the waveguide component, as well as to reflect the emission from the semiconductor nanoparticles to the viewer.

In embodiment of the invention including a layer comprising quantum confined semiconductor nanoparticles on a surface of the waveguide component, the optical component can optionally further include a cover, coating or layer over at least the portion of the surface upon which the layer comprising quantum confined semiconductor nanoparticles are disposed for protection from the environment (e.g., dust, moisture, and the like) and/or scratching or abrasion.

In certain embodiments, an optical component can further include a lens, prismatic surface, grating, etc. on the surface thereof from which light is emitted. Anti-reflection, light polarizing, and/or other coatings can also optionally be included on such surface.

The present invention will be further clarified by the following examples, which are intended to be exemplary of the present invention.

Example 1

Preparation of Semiconductor Nanocrystals Capable of Emitting Green Light

Synthesis of ZnSe Cores:
0.69 mmol diethyl zinc was dissolved in 5 mL of tri-n-octylphosphine and mixed with 1 mL of 1 M TBP-Se. 28.9 mmol of Oleylamine was loaded into a 3-neck flask, dried and degassed at 90° C. for one hour. After degassing, the flask was heated to 310° C. under nitrogen. Once the temperature reached 310° C., the Zn solution was injected and the reaction mixture was heated at 270° C. for 15-30 minutes while aliquots of the solution were removed periodically in order to monitor the growth of the nanocrystals. Once the first absorption peak of the nanocrystals reached 350 nm, the reaction was stopped by dropping the flask temperature to 160° C. and used without further purification for preparation of CdZnSe cores.

Synthesis of CdZnSe Cores:

1.12 mmol dimethylcadmium was dissolved in 5 mL of tri-n-octylphosphine and mixed with 1 mL of 1 M TBP-Se. In a 4-neck flask, 41.38 mmol of trioctylphosphine oxide and 4 mmol of hexylphosphonic acid were loaded, dried and degassed at 120° C. for one hour. After degassing, the oxide/acid was heated to 160° C. under nitrogen and 8 ml of the ZnSe core growth solution was transferred at 160° C. into the flask, immediately followed by the addition of Cd/Se solution over the course of 20 minutes via syringe pump. The reaction mixture was then heated at 150° C. for 16-20 hours while aliquots of the solution were removed periodically in order to monitor the growth of the nanocrystals. Once the emission peak of the nanocrystals reached 500 nm, the reaction was stopped by cooling the mixture to room temperature. The CdZnSe cores were precipitated out of the growth solution inside a nitrogen atmosphere glove box by adding a 2:1 mixture of methanol and n-butanol. The isolated cores were then dissolved in hexane and used to make core-shell materials.

Synthesis of CdZnSe/CdZnS Core-Shell Nanocrystals:

25.86 mmol of trioctylphosphine oxide and 2.4 mmol of benzylphosphonic acid were loaded into a four-neck flask. The mixture was then dried and degassed in the reaction vessel by heating to 120° C. for about an hour. The flask was then cooled to 75° C. and the hexane solution containing isolated CdZnSe cores (0.1 mmol Cd content) was added to the reaction mixture. The hexane was removed under reduced pressure. Dimethyl cadmium, diethyl zinc, and hexamethyldisilathiane were used as the Cd, Zn, and S precursors, respectively. The Cd and Zn were mixed in equimolar ratios while the S was in two-fold excess relative to the Cd and Zn. The Cd/Zn and S samples were each dissolved in 4 mL of trioctylphosphine inside a nitrogen atmosphere glove box. Once the precursor solutions were prepared, the reaction flask was heated to 150° C. under nitrogen. The precursor solutions were added dropwise over the course of 2 hours at 150° C. using a syringe pump. After the shell growth, the nanocrystals were transferred to a nitrogen atmosphere glovebox and precipitated out of the growth solution by adding a 3:1 mixture of methanol and isopropanol. The isolated core-shell nanocrystals were then dissolved in hexane and used to make compositions including quantum confined semiconductor nanoparticles and a host material.

Example 2

Preparation of Semiconductor Nanocrystals Capable of Emitting Red Light

Synthesis of CdSe Cores:

1 mmol cadmium acetate was dissolved in 8.96 mmol of tri-n-octylphosphine at 100° C. in a 20 mL vial and then dried and degassed for one hour. 15.5 mmol of trioctylphosphine oxide and 2 mmol of octadecylphosphonic acid were added to a 3-neck flask and dried and degassed at 140° C. for one hour. After degassing, the Cd solution was added to the oxide/acid flask and the mixture was heated to 270° C. under nitrogen. Once the temperature reached 270° C., 8 mmol of tri-n-butylphosphine was injected into the flask. The temperature was brought back to 270° C. where 1.1 mL of 1.5 M TBP-Se was then rapidly injected. The reaction mixture was heated at 270° C. for 15-30 minutes while aliquots of the solution were removed periodically in order to monitor the growth of the nanocrystals. Once the first absorption peak of the nanocrystals reached 565-575 nm, the reaction was stopped by cooling the mixture to room temperature. The CdSe cores were precipitated out of the growth solution inside a nitrogen atmosphere glovebox by adding a 3:1 mixture of methanol and isopropanol. The isolated cores were then dissolved in hexane and used to make core-shell materials.

Synthesis of CdSe/CdZnS Core-Shell Nanocrystals:

25.86 mmol of trioctylphosphine oxide and 2.4 mmol of octadecylphosphonic acid were loaded into a four-neck flask. The mixture was then dried and degassed in the reaction vessel by heating to 120° C. for about an hour. The flask was then cooled to 75° C. and the hexane solution containing isolated CdSe cores (0.1 mmol Cd content) was added to the reaction mixture. The hexane was removed under reduced pressure and then 2.4 mmol of 6-amino-1-hexanol was added to the reaction mixture. Dimethyl cadmium, diethyl zinc, and hexamethyldisilathiane were used as the Cd, Zn, and S precursors, respectively. The Cd and Zn were mixed in equimolar ratios while the S was in two-fold excess relative to the Cd and Zn. The Cd/Zn and S samples were each dissolved in 4 mL of trioctylphosphine inside a nitrogen atmosphere glove box. Once the precursor solutions were prepared, the reaction flask was heated to 155° C. under nitrogen. The precursor solutions were added dropwise over the course of 2 hours at 155° C. using a syringe pump. After the shell growth, the nanocrystals were transferred to a nitrogen atmosphere glovebox and precipitated out of the growth solution by adding a 3:1 mixture of methanol and isopropanol. The isolated core-shell nanocrystals were then dissolved in hexane and used to make compositions including quantum confined semiconductor nanoparticles and a host material.

Preparation of Layer Including Semiconductor Nanocrystals

Samples including semiconductor nanocrystals prepared substantially in accordance with one of the above-described examples are received in hexane. (A sample typically represents approximately 40 mg of solid dispersed in 10-15 ml hexane.) The hexane is removed from the dots under vacuum at room temperature. Care is taken not to overdry or completely remove all solvent. 0.5 ml of a proprietary, low viscosity reactive diluent RD-12, commercially available from Radcure Corp, 9 Audrey P I, Fairfield, N.J. 07004-3401, United States, is added to the semiconductor nanocrystals while stirring magnetically. After the semiconductor nanocrystals are pre-solubilized in the reactive diluent, 2 ml of a proprietary UV-curable acrylic formulation DR-150, also commercially available from Radcure Corp.) is added dropwise while stirring vigorously. Occasionally, the mixing vial is heated to lower viscosity and aid stirring. After the addition is competed, vacuum is pulled to remove entrained air and residual solvent. The vial is then placed in an ultrasonic bath (VWR) from 1 hour to overnight, resulting in a clear, colored solution. Care is taken to avoid temperatures over 40 C while the sample is in the ultrasonic bath.

Multiple batches of the semiconductor nanocrystals of the same color in UV curable acrylic are mixed together. For the samples below (Table 2), the three red batches listed in Table 1 were added together; and four green batches listed in Table 1 were added together.

Samples are coated by Mayer rod on precleaned glass slides and cured in a 5000-EC UV Light Curing Flood Lamp from DYMAX Corporation system with an H-bulb (225 mW/cm$^2$) for 10 seconds.

Samples including multiple layers for achieving the desired thickness are cured between layers. Samples including filters on top of (or below) the layers including host material and quantum confined semiconductor nanoparticles have the filters coated by Mayer rod in a separate step. Filters are made by blending UV-curable pigment ink formulations from Coates/Sun Chemical. (Examples include, but are not limited to, DXT-1935 and WIN99.) A filter composition is formulated by adding the weighted absorbances of the individual colors together to achieve the desired transmission characteristics.

TABLE 1

| Color/Batch # | Solvent | Ligand(s) | Emission (nm) | FWHM | Solution QY (%) |
|---|---|---|---|---|---|
| Red/Batch #1 (Nanocrystals prepared generally in accordance with procedures described in EXAMPLE 2 above) | Hexane | ODPA with 6-amino-1-hexanol | 617 | 40 | 73 |
| Red/Batch #2 (Nanocrystals prepared generally in accordance with procedures described in EXAMPLE 2 above) | Hexane | ODPA with 6-amino-1-hexanol | 622 | 44 | 82 |
| Red/Batch #3 (Nanocrystals prepared generally in accordance with procedures described in EXAMPLE 2 above) | Hexane | ODPA with 6-amino-1-hexanol | 624 | 44 | 73 |
| Green/Batch #1 (Nanocrystals prepared generally in accordance with procedures described in EXAMPLE 1 above) | Hexane | Aromatic | 525 | 34 | 68 |
| Green/Batch #2 (Nanocrystals prepared generally in accordance with procedures described in EXAMPLE 1 above) | Hexane | Aromatic | 527 | 34 | 66 |
| Green/Batch #3 (Nanocrystals prepared generally in accordance with procedures described in EXAMPLE 1 above) | Hexane | Aromatic | 528 | 36 | 64 |
| Green/Batch #4 (Nanocrystals prepared generally in accordance with procedures described in EXAMPLE 1 above) | Hexane | Aromatic | 530 | 33 | 60 |
| Green/Batch #5 (Nanocrystals prepared generally in accordance with procedures described in EXAMPLE 1 above) | Hexane | Aromatic | 529 | 33 | 68 |

The films were characterized in the following ways:
Thickness: measured by a micrometer.
Emission measurement measured on sample 1 of each type, on Cary Eclipse.
Excitation at 450 nm, 2.5 nm excitation slit, 5 nm emission slit.
Absorption measured at 450 nm on sample 1 of each type, on Cary 5000. Baseline corrected to blank glass slide.
CIE coordinates measured on sample 1 of each type using CS-200 Chroma Meter. Samples were excited with 450 nm LED, and camera collected color data off axis.

Figure 4:
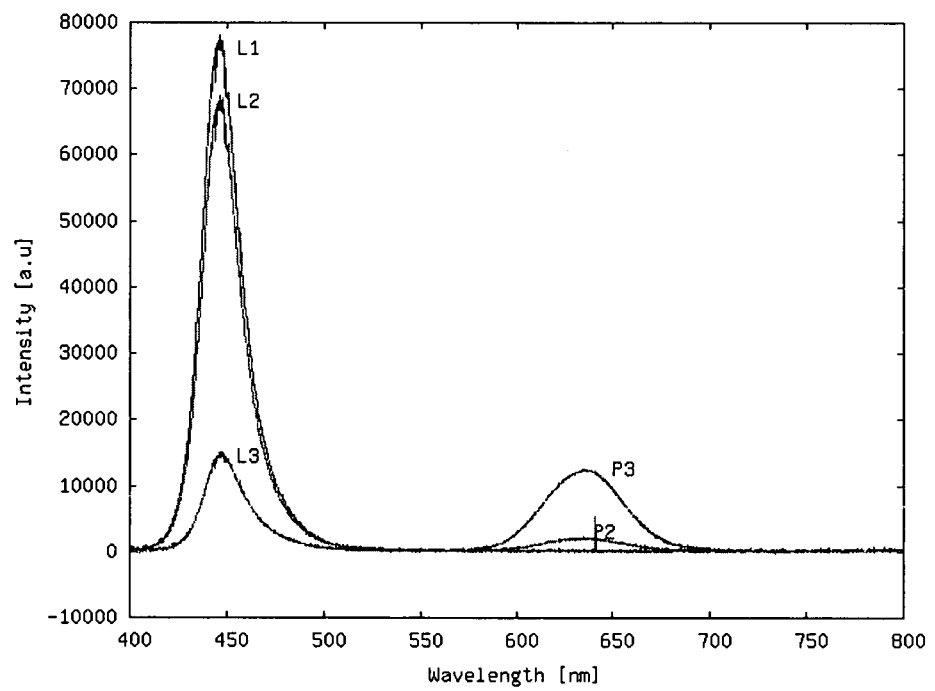
FIG. 4 depicts spectra to illustrate a method for measuring quantum efficiency.

The external photoluminescent (PL) quantum efficiency is measured using the method developed by Mello et al., Advanced Materials 9(3):230 (1997), which is hereby incorporated by reference. (1). The method uses a collimated 450 nm LED source, an integrating sphere and a spectrometer. Three measurements are taken. First, the LED directly illuminates the integrating sphere giving a spectrum labeled L1 and shown in FIG. 4 (which graphically represents emission intensity (a.u.) as a function of wavelength (nm)) for purposes of example in describing this method. Next, the PL sample is placed into the integrating sphere so that only diffuse LED light illuminates the sample giving the (L2+P2) spectrum shown for purposes of example in FIG. 4. Finally, the PL sample is placed into the integrating sphere so that the LED directly illuminates the sample ((just off normal incidence) giving the (L3+P3) spectrum shown for purposes of example 4. After collecting the data, each spectral contribution (L's and P's) is computed. L1, L2 and L3 correspond to the sums of the LED spectra for each measurement and P2 and P3 are the sums associated with the PL spectra for 2nd and 3rd measurements. The following equation then gives the external PL quantum efficiency:

$$EQE = [(P3 \cdot L2) \text{minus} (P2 \cdot L3)] / (L1 \cdot (L2 \text{minus} L3))$$

TABLE 2

Data For Films Prepared As Described Above Including Semiconductor Nanocrystals of the Examples

| Sample No. | Ligands | Filter | No. of Layers | Film Thickness (mm) | Emission (nm) | FWHM | CIE x y | Absorption (%) @ 450 nm | Film EQE |
|---|---|---|---|---|---|---|---|---|---|
| Red #A1 | ODPA with 6-amino-1-hexanol | None | 1 #28 rod | ~40 | 625 | 42 | 0.5712 0.2646 | 44 | 36.57 |
| Red B1 | ODPA with 6-amino-1-hexanol | None | 1 layer (#52 rod) | ~80 | 625 | 42 | 0.6317 0.2965 (Red B1) | 65(Red B1) | 39.23 |

TABLE 2-continued

Data For Films Prepared As Described Above Including Semiconductor Nanocrystals of the Examples

| Sample No. | Ligands | Filter | No. of Layers | Film Thickness (mm) | Emission (nm) | FWHM | CIE x y | Absorption (%) @ 450 nm | Film EQE |
|---|---|---|---|---|---|---|---|---|---|
| Red C1 | ODPA with 6-amino-1-hexanol | None | 2 layers: 1 layer (#52 rod) + 1 layer(#28 rod) | ~130 | 625 | 42 | 0.6549 0.3058 (Red C1) | 84(Red C1) | 30.27 |
| Red CF1 | ODPA with 6-amino-1-hexanol | DXT-1935:WIN99 (5 parts:1 part), 1 layer (23 micron) | 2 layers: 1 layer (#52 rod) + 1 layer (#28 rod) | ~155 | 625 | 42 | 0.6701 0.3110 (Red CF1) | 99.6(Red CF1) | Not applicable when filter included |
| Green A1 | Aromatic | None | 1 layer (#22 rod) | ~40 | 530 | 31 | 0.1917 0.6663 (Green A1) | 53(Green A1) | 32.78 |
| Green B1 | Aromatic | None | 1 layer (#52 rod) | ~75 | 530 | 31 | 0.2017 0.6882 (Green B1) | 77(Green B1) | 36.1 |
| Green C1 | Aromatic | None | 2 layers: 1 layer (#52 rod) + 1 layer (#22 rod) | ~120 | 530 | 31 | 0.2137 0.7237 (Green C1) | 91(Green C1) | 25.39 |
| Green CF1 | Aromatic | DXT-1935:WIN99 (5 parts:1 part), 1 layer (23 micron) | 2 layers: 1 layer (#52 rod) + 1 layer (#22 rod) | ~140 | 530 | 31 | 0.2342 0.7036 (Green CF1) | 99.5(Green CF1) | Not applicable when filter included |

Example 3

Preparation of Semiconductor Nanocrystals Capable of Emitting Red Light with 3,5-di-tert-butyl-4-hydroxybenzylphosphonic acid Synthesis of CdSe Cores:

1 mmol cadmium acetate was dissolved in 8.96 mmol of tri-n-octylphosphine at 100° C. in a 20 mL vial and then dried and degassed for one hour. 15.5 mmol of trioctylphosphine oxide and 2 mmol of octadecylphosphonic acid were added to a 3-neck flask and dried and degassed at 140° C. for one hour. After degassing, the Cd solution was added to the oxide/acid flask and the mixture was heated to 270° C. under nitrogen. Once the temperature reached 270° C., 8 mmol of tri-n-butylphosphine was injected into the flask. The temperature was brought back to 270° C. where 1.1 mL of 1.5 M TBP-Se was then rapidly injected. The reaction mixture was heated at 270° C. for 15-30 minutes while aliquots of the solution were removed periodically in order to monitor the growth of the nanocrystals. Once the first absorption peak of the nanocrystals reached 565-575 nm, the reaction was stopped by cooling the mixture to room temperature. The CdSe cores were precipitated out of the growth solution inside a nitrogen atmosphere glovebox by adding a 3:1 mixture of methanol and isopropanol. The isolated cores were then dissolved in hexane and used to make core-shell materials.

Preparation of 3,5-Di-tert-butyl-4-hydroxybenzylphosphonic acid 3,5-Di-tert-butyl-4-hydroxybenzylphosphonic acid was obtained from PCI Synthesis, 9 Opportunity Way, Newburyport, Mass. 01950.

The preparation of 3,5-Di-tert-butyl-4-hydroxybenzylphosphonic acid utilized the following synthetic approach:

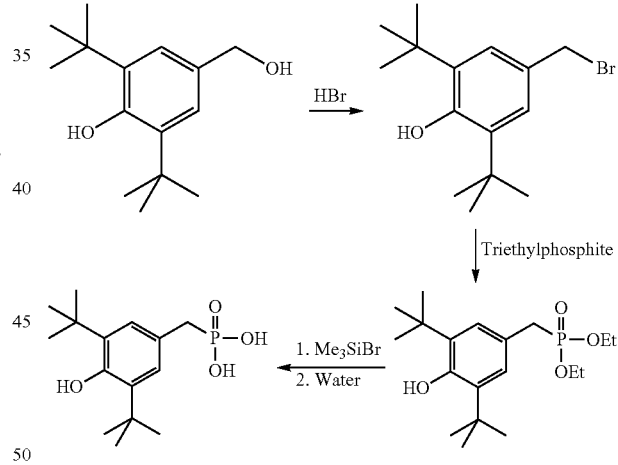

3,5-Di-tert-butyl-4-hydroxybenzylphosphonic acid can be characterized by the following:

Melting point: 199-200° C. [Lit: 200° C.; Literature ref: J. D. Spivack, FR1555941 (1969)] IR: 3614 cm$^{-1}$, 3593 cm$^{-1}$ (weak, O—H stretching).

$^1$H-NMR (CD$_3$OD): δ 7.10 (d, aromatic, 2H, $J_{P-H}$=2.6 Hz), 5.01 (s, exchanged HOD), 2.99 (d, —CH$_2$, 2H, $J_{P-H}$=21.2 Hz), 1.41 (s, —CH$_3$, 18H).

$^{13}$C-NMR (CD$_3$OD): δ 152.9 (aromatic), 137.9 (aromatic), 126.2 (aromatic), 123.5 (aromatic), 34.41 (d, —CH$_2$, 35.75, 33.07, $J_{P-C}$=537.2 Hz), 34.35 (—$\underline{C}$(CH$_3$)$_3$), 29.7 (—C($\underline{CH_3}$)$_3$).

$^{31}$P-NMR (CD$_3$OD): δ 26.8

The above-identified synthetic precursors included in the preparation of 3,5-Di-tert-butyl-4-hydroxybenzylphosphonic acid can be characterized by the following:

Diethyl 3,5-di-tert-butyl-4-hydroxybenzylphosphonate

Melting point: 119-120° C. (Lit: 118-119° C.; Literature ref: R. K. Ismagilov, *Zhur. Obshchei Khimii*, 1991, 61, 387).
IR: 3451 cm$^{-1}$ (weak, —OH, stretching), 2953 (weak, —CH$_3$, C—H stretching).
$^1$H-NMR (CDCl$_3$): δ 7.066 (d, Ar—H, 2H, J$_{P-H}$=2.8 Hz), 5.145 (s, 1H, —OH), 4.06-3.92 (m, —CH$_2$CH$_3$, 4H, H—H and long-range P—H couplings), 3.057 (d, Ar—CH$_2$, 2H, J$_{P-H}$=21.0 Hz), 1.412 (s, —C(CH$_3$)$_3$, 18H), 1.222 (t, —CH$_2$CH$_3$, 6H).
$^{13}$C-NMR (CDCl$_3$): δ 153.98 (aromatic), 136.22 (aromatic), 126.61 (aromatic), 122.07 (aromatic), 62.14 (—OCH$_2$CH$_3$, J$_{P-C}$=24.4 Hz), 33.63 (Ar—CH$_2$, J$_{P-C}$=552.4 Hz), 34.53 [—C(CH$_3$)$_3$], 30.54 [—C(CH$_3$)$_3$], 16.66 (—CH$_2$CH$_3$, J$_{P-C}$=24.4 Hz).
$^{31}$P-NMR (CDCl$_3$): δ 28.43.

3,5-di-tert-butyl-4-hydroxybenzyl bromide

Melting point: 51-54° C. (Lit: 52-54° C.; Literature ref: J. D. McClure, *J. Org. Chem.*, 1962, 27, 2365)
IR: 3616 cm$^{-1}$ (medium, O—H stretching), 2954 cm$^{-1}$ (weak, alkyl C—H stretching).
$^1$H-NMR (CDCl$_3$): δ 7.20 (s, Ar—H, 2H), 5.31 (s, —OH), 4.51 (s, —CH$_2$, 2H), 1.44 {s, [—C(CH$_3$)$_3$], 18H}.
$^{13}$C-NMR (CDCl$_3$): δ 154.3 (aromatic), 136.5 (aromatic), 128.7 (aromatic), 126.3 (aromatic), 35.8 [(—C(CH$_3$)$_3$], 34.6 (—CH$_2$), 30.5 [—C(CH$_3$)$_3$].

Other synthetic approaches that are known or readily ascertainable by one of ordinary skill in the relevant art can be used to prepare 3,5-Di-tert-butyl-4-hydroxybenzylphosphonic acid.

Synthesis of CdSe/CdZnS Core-Shell Nanocrystals 25.86 mmol of trioctylphosphine oxide and 2.4 mmol of 3,5-di-tert-butyl-4-hydroxybenzylphosphonic acid were loaded into a four-neck flask. The mixture was then dried and degassed in the reaction vessel by heating to 120° C. for about an hour. The flask was then cooled to 75° C. and the hexane solution containing isolated CdSe cores (0.1 mmol Cd content) was added to the reaction mixture. The hexane was removed under reduced pressure. Dimethyl cadmium, diethyl zinc, and hexamethyldisilathiane were used as the Cd, Zn, and S precursors, respectively. The Cd and Zn were mixed in equimolar ratios while the S was in two-fold excess relative to the Cd and Zn. The Cd/Zn and S samples were each dissolved in 4 mL of trioctylphosphine inside a nitrogen atmosphere glove box. Once the precursor solutions were prepared, the reaction flask was heated to 155° C. under nitrogen. The precursor solutions were added dropwise over the course of 2 hours at 155° C. using a syringe pump. After the shell growth, the nanocrystals were transferred to a nitrogen atmosphere glovebox and precipitated out of the growth solution by adding a 3:1 mixture of methanol and isopropanol. The isolated core-shell nanocrystals were then dissolved in chloroform and used to make semiconductor nanocrystal composite materials.

In Table 3, the 3,5-di-tert-butyl-4-hydroxybenzylphosphonic acid ligand group is referred to as BHT.

Preparation of Layer Including Semiconductor Nanocrystals

Films listed in Table 3 below are prepared using samples including semiconductor nanocrystals prepared substantially in accordance with the synthesis described in Example 3. Bulk chloroform is removed from the nanocrystal samples with nitrogen purging. Residual chloroform is removed from the semiconductor nanocrystals under vacuum at room temperature. Care is taken not to overdry or completely remove all solvent.

37 ml of RD-12, a low viscosity reactive diluent commercially available from Radcure Corp, 9 Audrey P I, Fairfield, N.J. 07004-3401, United States, is added to 4.68 gram of semiconductor nanocrystals under vacuum. The vessel is then backfilled with nitrogen and the mixture is mixed using a vortex mixer. After the semiconductor nanocrystals are pre-solubilized in the reactive diluent, 156 ml of DR-150, an UV-curable acrylic formulation commercially available Radcure, is added slowly under vacuum. The vessel is then backfilled with nitrogen and the mixture is mixed using a vortex mixer.

2.00 gram TiO2 (if indicated) is next added and the mixture is mixed with an homogenizer.

12.00 gram curing agent Escacure TPO is added, following which the mixture is mixed with an homogenizer. The vessel including the mixture is then wrappered with black tape to shield the fluid from light.

The vessel in then backfilled with nitrogen and sonified for at least about 3 hours. Care is taken to avoid temperatures over 40 C while the sample is in the ultrasonic bath.

Samples are coated by Mayer rod on precleaned glass slides and cured in a 5000-EC UV Light Curing Flood Lamp from DYMAX Corporation system with an H-bulb (225 mW/cm$^2$) for 10 seconds.

A sample is removed for evaluation and coated on a glass slide with a 52 rod and cured for 10 sec:
Thickness=72 μm
Lambda em=633.1 nm FWHM=36 nm
% EQE=50.0% % A$_{450\ nm}$=82.6%

Occasionally, the mixing vial is heated to lower viscosity and aid stirring. After the addition is competed, vacuum is pulled to remove entrained air. The vial is then placed in an ultrasonic bath (VWR) from 1 hour to overnight, resulting in a clear, colored solution. Care is taken to avoid temperatures over 40 C while the sample is in the ultrasonic bath.

Multiple batches of the semiconductor nanocrystals of the same color are mixed together. Prior to making the acrylic preparation. Samples are coated by Mayer rod on precleaned glass slides and cured in a 5000-EC UV Light Curing Flood Lamp from DYMAX Corporation system with an H-bulb (225 mW/cm$^2$) for 10 seconds.

Samples including multiple layers for achieving the desired thickness are cured between layers. Samples including filters on top of (or below) the layers including host material and quantum confined semiconductor nanoparticles have the filters coated by Mayer rod in a separate step.

Filters are made by blending UV-curable pigment ink formulations from Coates/Sun Chemical. (Examples include, but are not limited to, DXT-1935 and WIN99.) A filter composition is formulated by adding the weighted absorbances of the individual colors together to achieve the desired transmission characteristics.

TABLE 3

| Film Color/Sample # (Nanocrystal Prep. Example #) | Solvent | Ligand(s) | Emission (nm) | FWHM | Film EQE (%) |
|---|---|---|---|---|---|
| Red/Sample #1 (without TiO2) (Ex. 3) | Chloroform | BHT | 631 | 36 | 29.0 |

TABLE 3-continued

| Film Color/Sample # (Nanocrystal Prep. Example #) | Solvent | Ligand(s) | Emission (nm) | FWHM | Film EQE (%) |
|---|---|---|---|---|---|
| Red/Sample # 2 (with TiO2) (Ex. 3) | Chloroform | BHT | 633 | 36 | 50.0 |

Quantum confined semiconductor nanoparticles (including, e.g., semiconductor nanocrystals) are nanometer-scale inorganic semiconductor nanoparticles. Semiconductor nanocrystals include, for example, inorganic crystallites between about 1 nm and about 1000 nm in diameter, preferably between about 2 nm and about 50 um, more preferably about 1 nm to about 20 nm (such as about 6, 7, 8, 9, 10, 11, 12, 13, 14, 15, 16, 17, 18, 19, or 20 nm).

Semiconductor nanocrystals included in various aspect and embodiments of the inventions most preferably have an average nanocrystal diameter less than about 150 Angstroms (Å). In certain embodiments, semiconductor nanocrystals having an average nanocrystal diameter in a range from about 12 to about 150 Angstroms can be particularly desirable.

However, depending upon the composition and desired emission wavelength of the semiconductor nanocrystal, the average diameter may be outside of these various preferred size ranges.

The semiconductor forming the nanoparticles and nanocrystals can comprise Group IV elements, Group II-VI compounds, Group II-V compounds, Group III-VI compounds, Group III-V compounds, Group IV-VI compounds, Group I-III-VI compounds, Group II-IV-VI compounds, or Group II-IV-V compounds, for example, CdS, CdO, CdSe, CdTe, ZnS, ZnO, ZnSe, ZnTe, MgTe, GaAs, GaP, GaSb, GaN, HgS, HgO, HgSe, HgTe, InAs, InP, InSb, InN, AlAs, AlP, AlSb, AIS, PbS, PbO, PbSe, Ge, Si, alloys thereof, and/or mixtures thereof, including ternary and quaternary mixtures and/or alloys.

Examples of the shape of the nanoparticles and nanocrystals include sphere, rod, disk, other shape or mixtures thereof.

In certain preferred aspects and embodiments of the inventions, quantum confined semiconductor nanoparticles (including, e.g., semiconductor nanocrystals) include a "core" of one or more first semiconductor materials, which may include an overcoating or "shell" of a second semiconductor material on at least a portion of a surface of the core. In certain embodiments, the shell surrounds the core. A quantum confined semiconductor nanoparticle (including, e.g., semiconductor nanocrystal) core including a shell on at least a portion of a surface of the core is also referred to as a "core/shell" semiconductor nanocrystal.

For example, a quantum confined semiconductor nanoparticle (including, e.g., semiconductor nanocrystal) can include a core comprising a Group IV element or a compound represented by the formula MX, where M is cadmium, zinc, magnesium, mercury, aluminum, gallium, indium, thallium, or mixtures thereof, and X is oxygen, sulfur, selenium, tellurium, nitrogen, phosphorus, arsenic, antimony, or mixtures thereof. Examples of materials suitable for use as a core include, but are not limited to, CdS, CdO, CdSe, CdTe, ZnS, ZnO, ZnSe, ZnTe, MgTe, GaAs, GaP, GaSb, GaN, HgS, HgO, HgSe, HgTe, InAs, InP, InSb, InN, AlAs, AlP, AlSb, AIS, PbS, PbO, PbSe, Ge, Si, alloys thereof, and/or mixtures thereof, including ternary and quaternary mixtures and/or alloys. Examples of materials suitable for use as a shell include, but are not limited to, CdS, CdO, CdSe, CdTe, ZnS, ZnO, ZnSe, ZnTe, MgTe, GaAs, GaP, GaSb, GaN, HgS, HgO, HgSe, HgTe, InAs, InP, InSb, InN, AlAs, AlP, AlSb, AIS, PbS, PbO, PbSe, Ge, Si, alloys thereof, and/or mixtures thereof, including ternary and quaternary mixtures and/or alloys.

In certain embodiments, the surrounding "shell" material can have a bandgap greater than the bandgap of the core material and can be chosen so as to have an atomic spacing close to that of the "core" substrate. In another embodiment, the surrounding shell material can have a bandgap less than the bandgap of the core material. In a further embodiment, the shell and core materials can have the same crystal structure. Shell materials are discussed further below. For further examples of core/shell semiconductor structures, see U.S. application Ser. No. 10/638,546, entitled "Semiconductor Nanocrystal Heterostructures", filed 12 Aug. 2003, which is hereby incorporated herein by reference in its entirety.

Quantum confined semiconductor nanoparticles are preferably members of a population of semiconductor nanoparticles having a narrow size distribution. More preferably, the quantum confined semiconductor nanoparticles (including, e.g., semiconductor nanocrystals) comprise a monodisperse or substantially monodisperse population of nanoparticles.

In certain embodiments, the % absorption of quantum confined semiconductor nanoparticles included in the various aspects and embodiments of the inventions is, for example, from about 0.1% to about 99%; and preferably of at least about 10% to about 99%. In one preferred example, the % absorption is from about 10% to about 90% absorption. In another preferred example, the % absorption is from about 10% to about 50%; in another example, the % absorption if from about 50% to about 90%.

Quantum confined semiconductor nanoparticles show strong quantum confinement effects that can be harnessed in designing bottom-up chemical approaches to create optical properties that are tunable with the size and composition of the nanoparticles.

For example, preparation and manipulation of semiconductor nanocrystals are described in Murray et al. (J. Am. Chem. Soc., 115:8706 (1993)); in the thesis of Christopher Murray, "Synthesis and Characterization of II-VI Quantum Dots and Their Assembly into 3-D Quantum Dot Superlattices", Massachusetts Institute of Technology, September, 1995; and in U.S. patent application Ser. No. 08/969,302 entitled "Highly Luminescent Color-selective Materials" which are hereby incorporated herein by reference in their entireties. Other examples of the preparation and manipulation of semiconductor nanocrystals are described in U.S. Pat. Nos. 6,322,901 and 6,576,291, and U.S. Patent Application No. 60/550,314, each of which is hereby incorporated herein by reference in its entirety.

One example of a method of manufacturing a semiconductor nanocrystal is a colloidal growth process. Colloidal growth occurs by injection an M donor and an X donor into a hot coordinating solvent. One example of a preferred method for preparing monodisperse semiconductor nanocrystals comprises pyrolysis of organometallic reagents, such as dimethyl cadmium, injected into a hot, coordinating solvent. This permits discrete nucleation and results in the controlled growth of macroscopic quantities of semiconductor nanocrystals. The injection produces a nucleus that can be grown in a controlled manner to form a semiconductor nanocrystal. The reaction mixture can be gently heated to grow and anneal the semiconductor nanocrystal. Both the average size and the size distribution of the semiconductor nanocrystals in a sample are dependent on the growth temperature. The growth temperature necessary to maintain steady growth increases with increasing average crystal size. The semiconductor nanocrystal is a member of a population of semiconductor nanocrystals. As a result of the discrete nucleation and controlled growth, the population of semiconductor nanocrystals obtained has a narrow, monodisperse distribution of diameters. The monodisperse distribution of diameters can also be referred to as a size. Preferably, a monodisperse population of particles includes a population of particles wherein at least 60% of the particles in the population fall within a specified particle size range. A population of monodisperse particles preferably deviate less than 15% rms (root-mean-square) in diameter and more preferably less than 10% rms and most preferably less than 5%.

The narrow size distribution of the semiconductor nanocrystals allows the possibility of light emission in narrow spectral widths. Monodisperse semiconductor nanocrystals have been described in detail in Murray et al. (J. Am. Chem. Soc., 115:8706 (1993)); in the thesis of Christopher Murray, "Synthesis and Characterization of II-VI Quantum Dots and Their Assembly into 3-D Quantum Dot Superlattices", Massachusetts Institute of Technology, September, 1995; and in U.S. patent application Ser. No. 08/969,302 entitled "Highly Luminescent Color-selective Materials" which are hereby incorporated herein by reference in their entireties.

The process of controlled growth and annealing of the semiconductor nanocrystals in the coordinating solvent that follows nucleation can also result in uniform surface derivatization and regular core structures. As the size distribution sharpens, the temperature can be raised to maintain steady growth. By adding more M donor or X donor, the growth period can be shortened. The M donor can be an inorganic compound, an organometallic compound, or elemental metal, e.g., M can be cadmium, zinc, magnesium, mercury, aluminum, gallium, indium or thallium. The X donor is a compound capable of reacting with the M donor to form a material with the general formula MX. Typically, the X donor is a chalcogenide donor or a pnictide donor, such as a phosphine chalcogenide, a bis(silyl) chalcogenide, dioxygen, an ammonium salt, or a tris(silyl) pnictide. Suitable X donors include dioxygen, bis(trimethylsilyl) selenide ($(TMS)_2Se$), trialkyl phosphine selenides such as (tri-noctylphosphine) selenide (TOPSe) or (tri-n-butylphosphine) selenide (TBPSe), trialkyl phosphine tellurides such as (tri-n-octylphosphine) telluride (TOPTe) or hexapropylphosphorustriamide telluride (HPPTTe), bis(trimethylsilyl)telluride ($(TMS)_2Te$), bis(trimethylsilyl)sulfide ($(TMS)_2S$), a trialkyl phosphine sulfide such as (tri-noctylphosphine) sulfide (TOPS), an ammonium salt such as an ammonium halide (e.g., $NH_4Cl$), tris(trimethylsilyl) phosphide ($(TMS)_3P$), tris(trimethylsilyl) arsenide ($(TMS)_3As$), or tris(trimethylsilyl) antimonide ($(TMS)_3Sb$). In certain embodiments, the M donor and the X donor can be moieties within the same molecule.

A coordinating solvent can help control the growth of the semiconductor nanocrystal. The coordinating solvent is a compound having a donor lone pair that, for example, has a lone electron pair available to coordinate to a surface of the growing semiconductor nanocrystal. Solvent coordination can stabilize the growing semiconductor nanocrystal. Typical coordinating solvents include alkyl phosphines, alkyl phosphine oxides, alkyl phosphonic acids, or alkyl phosphinic acids, however, other coordinating solvents, such as pyridines, furans, and amines may also be suitable for the semiconductor nanocrystal production. Examples of suitable coordinating solvents include pyridine, tri-n-octyl phosphine (TOP), tri-n-octyl phosphine oxide (TOPO) and trishydroxylpropylphosphine (tHPP). Technical grade TOPO can be used.

Size distribution during the growth stage of the reaction can be estimated by monitoring the absorption or emission line widths of the particles. Modification of the reaction temperature in response to changes in the absorption spectrum of the particles allows the maintenance of a sharp particle size distribution during growth. Reactants can be added to the nucleation solution during crystal growth to grow larger crystals. For example, for CdSe and CdTe, by stopping growth at a particular semiconductor nanocrystal average diameter and choosing the proper composition of the semiconducting material, the emission spectra of the semiconductor nanocrystals can be tuned continuously over the wavelength range of 300 nm to 5 microns, or from 400 nm to 800 nm.

As discussed above, preferably quantum confined semiconductor nanoparticles (including, e.g., semiconductor nanocrystals) have a core/shell structure in which the core includes an overcoating on a surface of the core. The overcoating (also referred to as the shell) can be a semiconductor material having a composition that is the same as or different from the composition of the core. The overcoat of a semiconductor material on a surface of the core can include a Group II-VI compounds, Group II-V compounds, Group III-VI compounds, Group III-V compounds, Group IV-VI compounds, Group I-III-VI compounds, Group II-IV-VI compounds, and Group II-IV-V compounds, for example, ZnO, ZnS, ZnSe, ZnTe, CdO, CdS, CdSe, CdTe, MgS, MgSe, GaAs, GaN, GaP, GaSe, GaSb, HgO, HgS, HgSe, HgTe, InAs, InN, InP, InSb, AlAs, AlN, AlP, AlSb, TlN, TlP, TlAs, TlSb, PbO, PbS, PbSe, PbTe, alloys thereof, and/or mixtures thereof. For example, ZnS, ZnSe or CdS overcoatings can be grown on CdSe or CdTe nanocrystals. An overcoating process is described, for example, in U.S. Pat. No. 6,322,901. By adjusting the temperature of the reaction mixture during overcoating and monitoring the absorption spectrum of the core, overcoated materials having high emission quantum efficiencies and narrow size distributions can be obtained. The overcoating may comprise one or more layers. The overcoating comprises at least one semiconductor material which is the same as or different from the composition of the core. In certain embodiments, the overcoating has a thickness of from about one to about ten monolayers.

The particle size distribution of the semiconductor nanocrystals can be further refined by size selective precipitation with a poor solvent for the semiconductor nanocrystals, such as methanol/butanol as described in U.S. Pat. No. 6,322,901. For example, semiconductor nanocrystals can be dispersed in a solution of 10% butanol in hexane. Methanol can be added dropwise to this stirring solution until opalescence persists. Separation of supernatant and flocculate by centrifugation produces a precipitate enriched with the largest crystallites in the sample. This procedure can be repeated until no further sharpening of the optical absorption spectrum is noted. Size-selective precipitation can be carried out in a variety of solvent/nonsolvent pairs, including pyridine/hexane and chloroform/methanol. The size-selected semiconductor nanocrystal population preferably has no more than a 15% rms deviation from mean diameter, more preferably 10% rms deviation or less, and most preferably 5% rms deviation or less.

Additional examples of methods of preparing semiconductor nanocrystals are described in U.S. patent application Ser. No. 11/354,185 of Bawendi et al., entitled "Light Emitting Devices Including Semiconductor Nanocrystals", filed 15 Feb. 2006; U.S. patent application Ser. No. 11/253,595 of Coe-Sullivan et al., entitled "Light Emitting Device Including Semiconductor Nanocrystals", filed 21 Oct. 2005; U.S. patent application Ser. No. 10/638,546 of Kim et al., entitled "Semiconductor Nanocrystal Heterostructures", filed 12 Aug. 2003, referred to above; Murray, et al., J. Am. Chem. Soc., Vol. 115, 8706 (1993); Kortan, et al., J. Am. Chem. Soc., Vol. 112, 1327 (1990); and the Thesis of Christopher Murray, "Synthesis and Characterization of II-VI Quantum Dots and Their Assembly into 3-D Quantum Dot Superlattices", Massachusetts Institute of Technology, September, 1995, International Application No. PCT/US2007/13152 of Coe-Sullivan, et al., for "Light-Emitting Devices and Displays With Improved Performance", filed 4 Jun. 2007, U.S. Application No. 60/971,887 of Breen, et al., for "Functionalized Semiconductor Nanocrystals And Method", filed 12 Sep. 2007, U.S. Application No. 60/866,822 of Clough, et al., for "Nanocrystals Including A Group IIIA Element And A Group VA Element, Method, Composition, Device and Other Products", filed 21 Nov. 2006; U.S. Provisional Patent Application No. 60/866,828 of Craig Breen et al., for "Semiconductor Nanocrystal Materials And Compositions And Devices Including Same," filed 21 Nov. 2006; U.S. Provisional Patent Application No. 60/866,832 of Craig Breen et al. for "Semiconductor Nanocrystal Materials And Compositions And Devices Including Same," filed 21 Nov. 2006; U.S. Provisional Patent Application No. 60/866,833 of Dorai Ramprasad for "Semiconductor Nanocrystal And Compositions And Devices Including Same" filed 21 Nov. 2006; U.S. Provisional Patent Application No. 60/866,834 of Dorai Ramprasad for "Semiconductor Nanocrystal And Compositions And Devices Including Same," filed 21 Nov. 2006; U.S. Provisional Patent Application No. 60/866,839 of Dorai Ramprasad for "Semiconductor Nanocrystal And Compositions And Devices Including Same" filed 21 Nov. 2006; and U.S. Provisional Patent Application No. 60/866,843 of Dorai Ramprasad for "Semiconductor Nanocrystal And Compositions And Devices Including Same," filed 21 Nov. 2006. Each of the foregoing is hereby incorporated by reference herein in its entirety.

In various aspects and embodiments of the inventions contemplated by this disclosure, quantum confined semiconductor nanoparticles (including, but not limited to, semiconductor nanocrystals) optionally have ligands attached thereto.

In one embodiment, the ligands are derived from the coordinating solvent used during the growth process. The surface can be modified by repeated exposure to an excess of a competing coordinating group to form an overlayer. For example, a dispersion of the capped semiconductor nanocrystal can be treated with a coordinating organic compound, such as pyridine, to produce crystallites which disperse readily in pyridine, methanol, and aromatics but no longer disperse in aliphatic solvents. Such a surface exchange process can be carried out with any compound capable of coordinating to or bonding with the outer surface of the semiconductor nanocrystal, including, for example, phosphines, thiols, amines and phosphates. The semiconductor nanocrystal can be exposed to short chain polymers which exhibit an affinity for the surface and which terminate in a moiety having an affinity for a suspension or dispersion medium. Such affinity improves the stability of the suspension and discourages flocculation of the semiconductor nanocrystal. In other embodiments, semiconductor nanocrystals can alternatively be prepared with use of non-coordinating solvent(s).

For example, a coordinating ligand can have the formula:

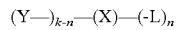

wherein k is 2, 3 or 5, and n is 1, 2, 3, 4 or 5 such that k–n is not less than zero; X is O, S, S=O, $SO_2$, Se, Se=O, N, N=O, P, P=O, As, or As=O; each of Y and L, independently, is aryl, heteroaryl, or a straight or branched C2-12 hydrocarbon chain optionally containing at least one double bond, at least one triple bond, or at least one double bond and one triple bond. The hydrocarbon chain can be optionally substituted with one or more C1-4 alkyl, C2-4 alkenyl, C2-4 alkynyl, C1-4 alkoxy, hydroxyl, halo, amino, nitro, cyano, C3-5 cycloalkyl, 3-5 membered heterocycloalkyl, aryl, heteroaryl, C1-4 alkylcarbonyloxy, C1-4 alkyloxycarbonyl, C1-4 alkylcarbonyl, or formyl. The hydrocarbon chain can also be optionally interrupted by —O—, —S—, —N(Ra)—, —N(Ra)—C(O)—O—, —O—C(O)—N(Ra)—, —N(Ra)—C(O)—N(Rb)—, —O—C(O)—O—, —P(Ra)—, or —P(O)(Ra)—. Each of Ra and Rb, independently, is hydrogen, alkyl, alkenyl, alkynyl, alkoxy, hydroxylalkyl, hydroxyl, or haloalkyl. An aryl group is a substituted or unsubstituted cyclic aromatic group. Examples include phenyl, benzyl, naphthyl, tolyl, anthracyl, nitrophenyl, or halophenyl. A heteroaryl group is an aryl group with one or more heteroatoms in the ring, for instance furyl, pyiridyl, pyrrolyi, phenanthryl.

A suitable coordinating ligand can be purchased commercially or prepared by ordinary synthetic organic techniques, for example, as described in J. March, Advanced Organic Chemistry, which is incorporated herein by reference in its entirety.

See also U.S. patent application Ser. No. 10/641,292 entitled "Stabilized Semiconductor Nanocrystals", filed 15 Aug. 2003, which is hereby incorporated herein by reference in its entirety.

When an electron and hole localize on a quantum confined semiconductor nanoparticle (including, but not limited to, a semiconductor nanocrystal), emission can occur at an emission wavelength. The emission has a frequency that corresponds to the band gap of the quantum confined semiconductor material. The band gap is a function of the size of the nanoparticle. Quantum confined semiconductor nanoparticles having small diameters can have properties intermediate between molecular and bulk forms of matter. For example, quantum confined semiconductor nanoparticles having small diameters can exhibit quantum confinement of both the electron and hole in all three dimensions, which leads to an increase in the effective band gap of the material with decreasing crystallite size. Consequently, for example, both the optical absorption and emission of semiconductor nanocrystals shift to the blue, or to higher energies, as the size of the crystallites decreases.

For an example of blue light-emitting semiconductor nanocrystal materials, see U.S. patent application Ser. No. 11/071,244, filed 4 Mar. 2005, which is hereby incorporated by reference herein in its entirety.

The emission from a quantum confined semiconductor nanoparticle can be a narrow Gaussian emission band that can be tuned through the complete wavelength range of the ultraviolet, visible, or infra-red regions of the spectrum by varying the size of the quantum confined semiconductor nanoparticle, the composition of the quantum confined semiconductor nanoparticle, or both. For example, CdSe can be tuned in the visible region and InAs can be tuned in the infra-red region. The narrow size distribution of a population of quantum confined semiconductor nanoparticles can result in emission of light in a narrow spectral range. The population can be monodisperse preferably exhibits less than a 15% rms (root-mean-square) deviation in diameter of the quantum confined semiconductor nanoparticle s, more preferably less than 10%, most preferably less than 5%. Spectral emissions in a narrow range of no greater than about 75 nm, preferably 60 nm, more preferably 40 nm, and most preferably 30 nm full width at half max (FWHM) for quantum confined semiconductor nanoparticle s that emit in the visible can be observed. IR-emitting quantum confined semiconductor nanoparticle s can have a FWHM of no greater than 150 nm, or no greater than 100 nm.

Expressed in terms of the energy of the emission, the emission can have a FWHM of no greater than 0.05 eV, or no greater than 0.03 eV. The breadth of the emission decreases as the dispersity of quantum confined semiconductor nanoparticle diameters decreases.

The narrow FWHM of semiconductor nanocrystals can result in saturated color emission. The broadly tunable, saturated color emission over the entire visible spectrum of a single material system is unmatched by any class of organic chromophores (see, for example, Dabbousi et al., J. Phys. Chem. 101, 9463 (1997), which is incorporated by reference in its entirety). A monodisperse population of semiconductor nanocrystals will emit light spanning a narrow range of wavelengths. A pattern including more than one size of semiconductor nanocrystal can emit light in more than one narrow range of wavelengths. The color of emitted light perceived by a viewer can be controlled by selecting appropriate combinations of semiconductor nanocrystal sizes and materials. The degeneracy of the band edge energy levels of semiconductor nanocrystals facilitates capture and radiative recombination of all possible excitons.

Transmission electron microscopy (TEM) can provide information about the size, shape, and distribution of the semiconductor nanocrystal population. Powder X-ray diffraction (XRD) patterns can provide the most complete information regarding the type and quality of the crystal structure of the semiconductor nanocrystals. Estimates of size are also possible since particle diameter is inversely related, via the X-ray coherence length, to the peak width. For example, the diameter of the semiconductor nanocrystal can be measured directly by transmission electron microscopy or estimated from X-ray diffraction data using, for example, the Scherrer equation. It also can be estimated from the UV/Vis absorption spectrum.

Quantum confined semiconductor nanoparticles are preferably handled in a controlled (oxygen-free and moisture-free) environment, preventing the quenching of luminescent efficiency during the fabrication process.

As used herein, "top", "bottom", "over", and "under" are relative positional terms, based upon a location from a reference point. More particularly, "top" means farthest away from a reference point, while "bottom" means closest to the reference point. Where, e.g., a layer is described as disposed or deposited "over" a component or substrate, the layer is disposed farther away from the component or substrate. There may be other layers between the layer and component or substrate. As used herein, "cover" is also a relative position term, based upon a location from a reference point. For example, where a first material is described as covering a second material, the first material is disposed over, but not necessarily in contact with the second material.

As used herein, the singular forms "a", "an" and "the" include plural unless the context clearly dictates otherwise. Thus, for example, reference to an emissive material includes reference to one or more of such materials.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. An optical component including a waveguide comprising from about 0.001 to about 15 weight percent quantum confined semiconductor nanoparticles based on the weight of the waveguide and non-luminescent scatterers in an amount in the range from about 0.001 to about 15 weight percent of the weight of the waveguide, wherein the scatterers increase absorption pathlength of excitation light used to excite the quantum confined semiconductor nanoparticles in the waveguide and aid in out-coupling of light down-converted by the nanoparticles.

2. An optical component in accordance with claim 1 further including a filter layer disposed over a surface of the waveguide.

3. An optical component in accordance with claim 1 wherein the quantum confined semiconductor nanoparticles comprise a core/shell structure.

4. An optical component in accordance with claim 1 wherein quantum confined semiconductor nanoparticles are included in a predetermined arrangement disposed over a predetermined region of a surface of the waveguide.

5. An optical component in accordance with claim 4 wherein the predetermined arrangement has a thickness from about 0.1 to about 200 microns.

6. An optical component including a waveguide including a composition comprising quantum confined semiconductor nanoparticles, non-luminescent scatterers, and a host material, wherein the composition includes from about 0.001 to about 15 weight percent quantum confined semiconductor nanoparticles based on the weight of the host material and from about 0.001 to about 15 weight percent scatterers based on the weight of the weight of the host material, and wherein the scatterers increase absorption pathlength of excitation light used to excite the quantum confined semiconductor nanoparticles in the host material and aid in out-coupling of light down-converted by the nanoparticles.

7. An optical component in accordance with claim 6 wherein the composition is disposed in a predetermined arrangement over a predetermined region of a surface of the waveguide.

8. An optical component in accordance with claim 7 wherein predetermined arrangement has a thickness from about 0.1 to about 200 microns.

9. An optical component including a waveguide including a layer comprising quantum confined semiconductor nanoparticles and a host material, wherein the layer includes from about 0.001 to about 15 weight percent quantum confined semiconductor nanoparticles based on the weight of the host material and wherein the layer further comprises non-luminescent scatterers, wherein the scatterers increase absorption pathlength of excitation light used to excite the quantum confined semiconductor nanoparticles in the host material and aid in out-coupling of light down-converted by the nanoparticles, and wherein the scatterers are included in the layer in an amount in the range from about 0.001 to about 15 weight percent of the weight of the host material.

10. An optical component comprising a film including a carrier substrate including quantum confined semiconductor nanoparticles and non-luminescent scatterers in a predetermined arrangement over a predetermined region of a surface thereof, wherein the scatterers increase absorption pathlength of excitation light used to excite the quantum confined semiconductor nanoparticles in the predetermined arrangement and aid in out-coupling of light down-converted by the nanoparticles, and wherein the film is attached to a surface of a waveguide.

11. An optical component comprising a film including a carrier substrate including a composition comprising quantum confined semiconductor nanoparticles, non-luminescent scatterers, and a host material, wherein the composition is disposed in a predetermined arrangement over a predetermined region of a surface thereof, wherein the scatterers increase absorption pathlength of excitation light used to excite the quantum confined semiconductor nanoparticles in the host material and aid in out-coupling of light down-converted by the nanoparticles, and wherein the film is attached to a surface of a waveguide, wherein the composition includes from about 0.001 to about 15 weight percent quantum confined semiconductor nanoparticles based on the weight of the host material, and wherein the scatterers are included in the composition in an amount in the range from about 0.001 to about 15 weight percent of the weight of the host material.

12. An optical component in accordance with claim 11 wherein the film comprises a decal.

13. A system comprising an optical component including a waveguide including a layer on a surface of the waveguide, wherein the layer comprises a composition comprising quantum confined semiconductor nanoparticles, non-luminescent scatterers, and a host material, wherein the layer includes from about 0.001 to about 15 weight percent quantum confined semiconductor nanoparticles based on the weight of the host material and from about 0.001 to about 15 weight percent scatterers based on the weight of the weight of the host material, and a light source optically coupled to the waveguide, and wherein the scatterers increase absorption pathlength of excitation light used to excite the quantum confined semiconductor nanoparticles in the host material and aid in out-coupling of light down-converted by the nanoparticles.

14. A system in accordance with claim 13 wherein the system comprises two or more optical components, and wherein the optical components are arranged such that the waveguide of each is parallel to that of each other optical component, and each optical component is coupled to a separate light source.

15. A system in accordance with claim 13 wherein the system comprises two or more optical components, and wherein the optical components are separated from each other such that there is no optical communication between the optical components.

16. A device including an optical component in accordance with claim 1.

17. A composition useful for altering the wavelength of visible or invisible light, the composition comprising a solid host material, non-luminescent scatterers, viscosity modifier, and quantum confined semiconductor nanoparticles, wherein the nanoparticles are included in the composition in amount in the range from about 0.001 to about 15 weight percent based on the weight of the host material and non-luminescent scatterers are included in the composition in amount in the range from about 0.001 to about 15 weight percent based on the weight of the host material, wherein the scatterers increase absorption pathlength of excitation light used to excite the quantum confined semiconductor nanoparticles in the host material and aid in out-coupling of light down-converted by the nanoparticles.

18. A film comprising a carrier substrate comprising a flexible component including a predetermined arrangement comprising a composition comprising quantum confined semiconductor nanoparticles and non-luminescent scatterers over a predetermined portion of a surface thereof, wherein the scatterers increase absorption pathlength of excitation light used to excite the quantum confined semiconductor nanoparticles in the film and aid in out-coupling of light down-converted by the nanoparticles, wherein the composition further includes in a host material, and the nanoparticles are included in the host material in amount in the range from about 0.001 to about 15 weight percent based on the weight of the host material and the scatterers are included in the host material in amount in the range from about 0.001 to about 15 weight percent based on the weight of the host material.

19. A film in accordance with claim 18 wherein the film comprises a decal.

20. A kit comprising a light source adapted for being optically coupled to a waveguide and one or more films adapted for being attached to a surface, wherein at least one film comprises a carrier substrate comprising a flexible component including quantum confined semiconductor nanoparticles and non-luminescent scatterers disposed over a surface thereof, wherein the scatterers increase absorption pathlength of excitation light used to excite the quantum confined semiconductor nanoparticles in the film and aid in out-coupling of light down-converted by the nanoparticles.

21. A method for making a sign comprising applying a film to a surface of a waveguide, coupling light into a surface or edge of the waveguide such that the light is waveguided within the waveguide and optically excites the quantum confined semiconductor nanoparticles included directly or indirectly on the waveguide surface, wherein the film comprises a carrier substrate including a predetermined arrangement comprising quantum confined semiconductor nanoparticles and non-luminescent scatterers over a predetermined portion of a surface thereof, wherein the scatterers increase absorption pathlength of excitation light used to excite the quantum confined semiconductor nanoparticles in the film and aid in out-coupling of light down-converted by the nanoparticles.

22. A method in accordance with claim 21 wherein the waveguide comprises a window or other structural, decorative, architectural, or other structure or element fabricated from a material with waveguiding capability.

23. A thin film electroluminescent lamp comprising a thin film electroluminescent lamp including a light-emitting surface and a layer disposed over the light-emitting surface, the layer comprising a composition in accordance with claim 17.

24. A thin film electroluminescent lamp in accordance with claim 23 further including one or more filter layers.

25. A thin film electroluminescent lamp in accordance with claim 23 further including one or more reflective layers.

26. A thin film electroluminescent lamp in accordance with claim 23 further including outcoupling features on the surface of the lamp over which the layer comprising the composition is disposed.

27. A thin film electroluminescent lamp in accordance with claim 23 further including outcoupling features over the layer comprising the composition.

28. An optical component in accordance with claim 9 further including a cover, coating or layer over at least the portion of the surface upon which the layer comprising quantum confined semiconductor nanoparticles are disposed for protection.

29. A kit in accordance with claim 20 wherein the film includes from about 0.001 to about 15 weight percent quantum confined semiconductor nanoparticles based on the weight of the film.

30. A kit in accordance with claim 20 wherein the film includes from about 0.001 to about 15 weight percent quantum confined semiconductor nanoparticles based on the weight of the film.

31. A kit in accordance with claim 20 wherein the nanoparticles and scatterers are included in a host material.

32. A kit in accordance with claim 31 wherein the nanoparticles are included in the host material in amount in the range from about 0.001 to about 15 weight percent based on the weight of the host material.

33. A kit in accordance with claim 31 wherein the scatterers are included in the host material in amount in the range from about 0.001 to about 15 weight percent based on the weight of the host material.

* * * * *